US011665555B2

(12) United States Patent
Horn et al.

(10) Patent No.: US 11,665,555 B2
(45) Date of Patent: May 30, 2023

(54) RECIPROCITY REPORT FOR WIRELESS COMMUNICATIONS SYSTEMS

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

(*) Notice: Subject to any disclaimer, the term of this patent is extended or adjusted under 35 U.S.C. 154(b) by 193 days.

(21) Appl. No.: 17/328,722

(22) Filed: May 24, 2021

(65) Prior Publication Data

US 2022/0377574 A1    Nov. 24, 2022

(51) Int. Cl.
*H04W 16/28* (2009.01)
*H04W 8/24* (2009.01)
*H04W 72/044* (2023.01)
*H04W 24/10* (2009.01)
*H04W 72/23* (2023.01)

(52) U.S. Cl.
CPC ............ *H04W 16/28* (2013.01); *H04W 8/24* (2013.01); *H04W 24/10* (2013.01); *H04W 72/046* (2013.01); *H04W 72/23* (2023.01)

(58) Field of Classification Search
CPC ... H04W 16/28; H04W 24/10; H04W 72/046; H04W 72/23; H04W 8/24
See application file for complete search history.

(56) References Cited

U.S. PATENT DOCUMENTS

| 10,123,322 | B1* | 11/2018 | Nam | H04L 1/0038 |
| 2009/0124284 | A1* | 5/2009 | Scherzer | H04M 1/72445 |
| | | | | 455/552.1 |
| 2013/0267239 | A1* | 10/2013 | Stancanelli | H04B 7/024 |
| | | | | 455/452.1 |
| 2020/0099434 | A1* | 3/2020 | Wang | H04B 7/0452 |
| 2021/0119749 | A1* | 4/2021 | Huang | H04L 5/0023 |

FOREIGN PATENT DOCUMENTS

WO    WO-2017196253 A1 * 11/2017 ........... H04B 7/0456

* cited by examiner

*Primary Examiner* — Mewale A Ambaye
(74) *Attorney, Agent, or Firm* — Arun Swain; Holland & Hart LLP

(57) ABSTRACT

Methods, systems, and devices for wireless communications are described. A user equipment (UE) may transmit, to a base station, a control message indicating a capability of the UE to identify and report a reciprocity parameter between downlink communications and uplink communications of a channel between the UE and the base station. In some examples, the base station may request a reciprocity report from the UE. The UE may identify a reciprocity parameter based on one or more parameters associated with an array of antennas at the UE. The reciprocity parameter may indicate a reciprocity between an uplink beam and a downlink beam, such as a degree of overlap between the uplink beam and the downlink beam. The UE may report the reciprocity parameter via a reciprocity report to the base station. In some examples, the base station may identify one or more parameters based on the reciprocity report.

30 Claims, 17 Drawing Sheets

RECIPROCITY REPORT FOR WIRELESS COMMUNICATIONS SYSTEMS

FIELD OF TECHNOLOGY

The following relates to wireless communications, including a reciprocity report for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support channel estimation techniques. For example, a base station may estimate uplink channel conditions based on reference signals transmitted from the UE to the base station. However, conventional techniques for channel estimation may be deficient. For example, the conventional techniques may result in relatively high signaling overhead, inaccurate channel estimation, or any combination thereof.

SUMMARY

The described techniques relate to improved methods, systems, devices, and apparatuses that support a reciprocity report for wireless communications systems. Generally, the described techniques enable wireless devices to implement channel reciprocity of uplink and downlink beams for channel estimation operations. For example, a user equipment (UE) may identify a reciprocity parameter indicating a reciprocity between a downlink beam and an uplink beam based on a configuration of an antenna array at the UE (e.g., one or more parameters associated with the antenna array), a working frequency, or the like. A reciprocity parameter may indicate a degree of similarities between conditions for uplink channels and downlink channels. In some communications systems, a receiving device (e.g., a base station or a UE) may measure channel conditions for a received channel (e.g., an uplink channel or a downlink channel) and then estimate channel conditions of a transmitting channel (e.g., a downlink channel or an uplink channel). When carrier frequencies are in some frequency ranges (e.g., FR2), the amount of similarities (e.g., the reciprocity) between the uplink channels and the downlink channels may vary. The UE may calculate or otherwise determine a degree of overlap or similarity between the downlink beam and the uplink beam. As one example, the UE may correlate a first power delay profile (PDP) corresponding to uplink communications with a second PDP corresponding to downlink communications. Additionally or alternatively, the UE may perform a reciprocity calculation to obtain the reciprocity parameter. The UE may indicate the reciprocity parameter via a reciprocity report to the base station.

In some examples, the base station may perform channel estimation based on the reciprocity report. For example, the base station may estimate uplink channel conditions based on one or more reference signals from the UE and the reciprocity parameter indicated in the reciprocity report. For example, the base station may identify a relatively high reciprocity parameter, which may indicate that a downlink channel and an uplink channel experience relatively similar conditions. The base station may use the same uplink channel estimation or an adjusted uplink channel estimation for the downlink channel estimation based on a value of the reciprocity parameter, which may enable the base station to estimate the downlink conditions without waiting for the UE to transmit a report indicating the downlink conditions. In some examples, a base station may transmit a request for the UE to reconfigure one or more antennas in an antenna array to increase the reciprocity between uplink and downlink beams. Additionally or alternatively, the base station may transmit a request to the UE to switch from a first transmission reception point (TRP) to a second TRP, which may lead to a relatively higher reciprocity value. By implementing reciprocity parameters as described herein, the base station and the UE may realize reduced signaling overhead (e.g., the base station may cancel or adjust a CSI-RS reporting) and improved efficiency of communications (e.g., higher throughput), among other benefits.

A method for wireless communications at a UE is described. The method may include transmitting, to a base station, a control message indicating a capability of the UE to identify a reciprocity parameter between downlink communications and uplink communications of a channel between the UE and the base station, communicating signals over the channel using an array of antennas of the UE based on transmitting the control message, and transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

An apparatus for wireless communications at a UE is described. The apparatus may include a processor, memory coupled with the processor, and instructions stored in the memory. The instructions may be executable by the processor to cause the apparatus to transmit, to a base station, a control message indicating a capability of the UE to identify a reciprocity parameter between downlink communications and uplink communications of a channel between the UE and the base station, communicate signals over the channel using an array of antennas of the UE based on transmitting the control message, and transmit a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

Another apparatus for wireless communications at a UE is described. The apparatus may include means for transmitting, to a base station, a control message indicating a capability of the UE to identify a reciprocity parameter between downlink communications and uplink communications of a channel between the UE and the base station, means for communicating signals over the channel using an array of antennas of the UE based on transmitting the control message, and means for transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

A non-transitory computer-readable medium storing code for wireless communications at a UE is described. The code may include instructions executable by a processor to transmit, to a base station, a control message indicating a capability of the UE to identify a reciprocity parameter between downlink communications and uplink communications of a channel between the UE and the base station, communicate signals over the channel using an array of antennas of the UE based on transmitting the control message, and transmit a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

Some examples of the method, apparatuses, and non-transitory computer-readable medium described herein may further include operations, features, means, or instructions for identifying the reciprocity parameter based on the one or more parameters associated with the array of antennas of the UE, where transmitting the report message may be based on identifying the reciprocity parameter.

In some examples of the method, apparatuses, and non-transitory computer-readable medium described herein, the one or more parameters associated with the array of antennas includes a quantity of antennas corresponding to a respective access link, a set of phase shifters corresponding to the respective access link, or a combination thereof, and identifying the reciprocity parameter may be based on the quantity of antennas and the set of phase shifters.

In some examples of the method, apparatuses, and non-transitory computer-readable medium described herein, identifying the reciprocity parameter may include operations, features, means, or instructions for calculating the reciprocity parameter based on a first directivity of a receive beam associated with the downlink communications and a second directivity of a transmit beam associated with the uplink communications.

In some examples of the method, apparatuses, and non-transitory computer-readable medium described herein, identifying the reciprocity parameter may include operations, features, means, or instructions for receiving a report indicating a first power delay profile of the uplink communications and correlating a second power delay profile of the downlink communications with the first power delay profile.

In some examples of the method, apparatuses, and non-transitory computer-readable medium described herein, the reciprocity parameter indicates a degree of overlap between an uplink beam and a downlink beam based on a frequency associated with the channel, the one or more parameters associated with the array of antennas, or both.

Some examples of the method, apparatuses, and non-transitory computer-readable medium described herein may further include operations, features, means, or instructions for receiving, from the base station, a request to adjust the one or more parameters associated with the array of antennas based on transmitting the report message and adjusting the one or more parameters in accordance with the received request.

In some examples of the method, apparatuses, and non-transitory computer-readable medium described herein, the request indicates a first transmission reception point and the method, apparatuses, and non-transitory computer-readable medium may include further operations, features, means, or instructions for switching from a second transmission reception point to the first transmission reception point for the uplink communications and the downlink communications based on receiving the request.

Some examples of the method, apparatuses, and non-transitory computer-readable medium described herein may further include operations, features, means, or instructions for receiving a request message from the base station that requests the report message, where transmitting the report message may be in response to receiving the request message.

Some examples of the method, apparatuses, and non-transitory computer-readable medium described herein may further include operations, features, means, or instructions for transmitting a performance report message during a connection establishment with the base station, where transmitting the report message may be based on transmitting the performance report message.

In some examples of the method, apparatuses, and non-transitory computer-readable medium described herein, the performance report message indicates a performance of the UE per rank in an additive white Gaussian noise model, one or more parameters associated with detection or decoding, or any combination thereof.

Some examples of the method, apparatuses, and non-transitory computer-readable medium described herein may further include operations, features, means, or instructions for receiving an indication to cancel or adjust a channel state information report based on transmitting the report message.

In some examples of the method, apparatuses, and non-transitory computer-readable medium described herein, communicating the signals over the channel may include operations, features, means, or instructions for transmitting a set of reference signals using the array of antennas, where transmitting the report message may be based on transmitting the set of reference signals.

A method for wireless communications at a base station is described. The method may include receiving, from a UE, a control message indicating a capability of the UE to identify a reciprocity parameter between downlink communications and uplink communications of a channel between the UE and the base station, communicating signals with the UE over the channel based on receiving the control message, and receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

An apparatus for wireless communications at a base station is described. The apparatus may include a processor, memory coupled with the processor, and instructions stored in the memory. The instructions may be executable by the processor to cause the apparatus to receive, from a UE, a control message indicating a capability of the UE to identify a reciprocity parameter between downlink communications and uplink communications of a channel between the UE and the base station, communicate signals with the UE over the channel based on receiving the control message, and receive a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

Another apparatus for wireless communications at a base station is described. The apparatus may include means for receiving, from a UE, a control message indicating a capability of the UE to identify a reciprocity parameter between downlink communications and uplink communications of a channel between the UE and the base station, means for communicating signals with the UE over the channel based on receiving the control message, and means for receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

A non-transitory computer-readable medium storing code for wireless communications at a base station is described. The code may include instructions executable by a processor to receive, from a UE, a control message indicating a capability of the UE to identify a reciprocity parameter between downlink communications and uplink communications of a channel between the UE and the base station, communicate signals with the UE over the channel based on receiving the control message, and receive a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

Some examples of the method, apparatuses, and non-transitory computer-readable medium described herein may further include operations, features, means, or instructions for identifying the reciprocity parameter based on receiving the report message.

In some examples of the method, apparatuses, and non-transitory computer-readable medium described herein, the reciprocity parameter indicates a degree of overlap between an uplink beam and a downlink beam based on a frequency associated with the channel, the one or more parameters associated with a set of antennas at the UE, or both.

Some examples of the method, apparatuses, and non-transitory computer-readable medium described herein may further include operations, features, means, or instructions for identifying a first channel measurement associated with the uplink communications based on communicating the signals with the UE and identifying a second channel measurement associated with the downlink communications using the first channel measurement and the reciprocity parameter.

Some examples of the method, apparatuses, and non-transitory computer-readable medium described herein may further include operations, features, means, or instructions for identifying one or more parameters associated with the downlink communications based on the second channel measurement and a reported signal to noise ratio, the one or more parameters including a pre-coding matrix indicator, a rank indicator, a modulation and coding scheme, or any combination thereof.

In some examples of the method, apparatuses, and non-transitory computer-readable medium described herein, communicating the signals over the channel may include operations, features, means, or instructions for receiving a set of reference signals, where identifying the first channel measurement may be based on receiving the set of reference signals.

Some examples of the method, apparatuses, and non-transitory computer-readable medium described herein may further include operations, features, means, or instructions for determining whether the reciprocity parameter satisfies a threshold and transmitting a request to adjust the one or more parameters associated with the array of antennas of the UE based on the reciprocity parameter failing to satisfy the threshold.

Some examples of the method, apparatuses, and non-transitory computer-readable medium described herein may further include operations, features, means, or instructions for transmitting a request message to the UE that requests the report message, where receiving the report message may be in response to transmitting the request message.

Some examples of the method, apparatuses, and non-transitory computer-readable medium described herein may further include operations, features, means, or instructions for receiving a performance report message during a connection establishment with the UE, where receiving the report message may be based on receiving the performance report message.

In some examples of the method, apparatuses, and non-transitory computer-readable medium described herein, the performance report message indicates a performance of the UE per rank in an additive white Gaussian noise model, one or more parameters associated with detection or decoding, or any combination thereof.

Some examples of the method, apparatuses, and non-transitory computer-readable medium described herein may further include operations, features, means, or instructions for identifying a first power delay profile of the uplink communications and transmitting, to the UE, a report indicating the first power delay profile of the uplink communications, where receiving the report message may be based on transmitting the report indicating the first power delay profile.

DETAILED DESCRIPTION

Figure 1:
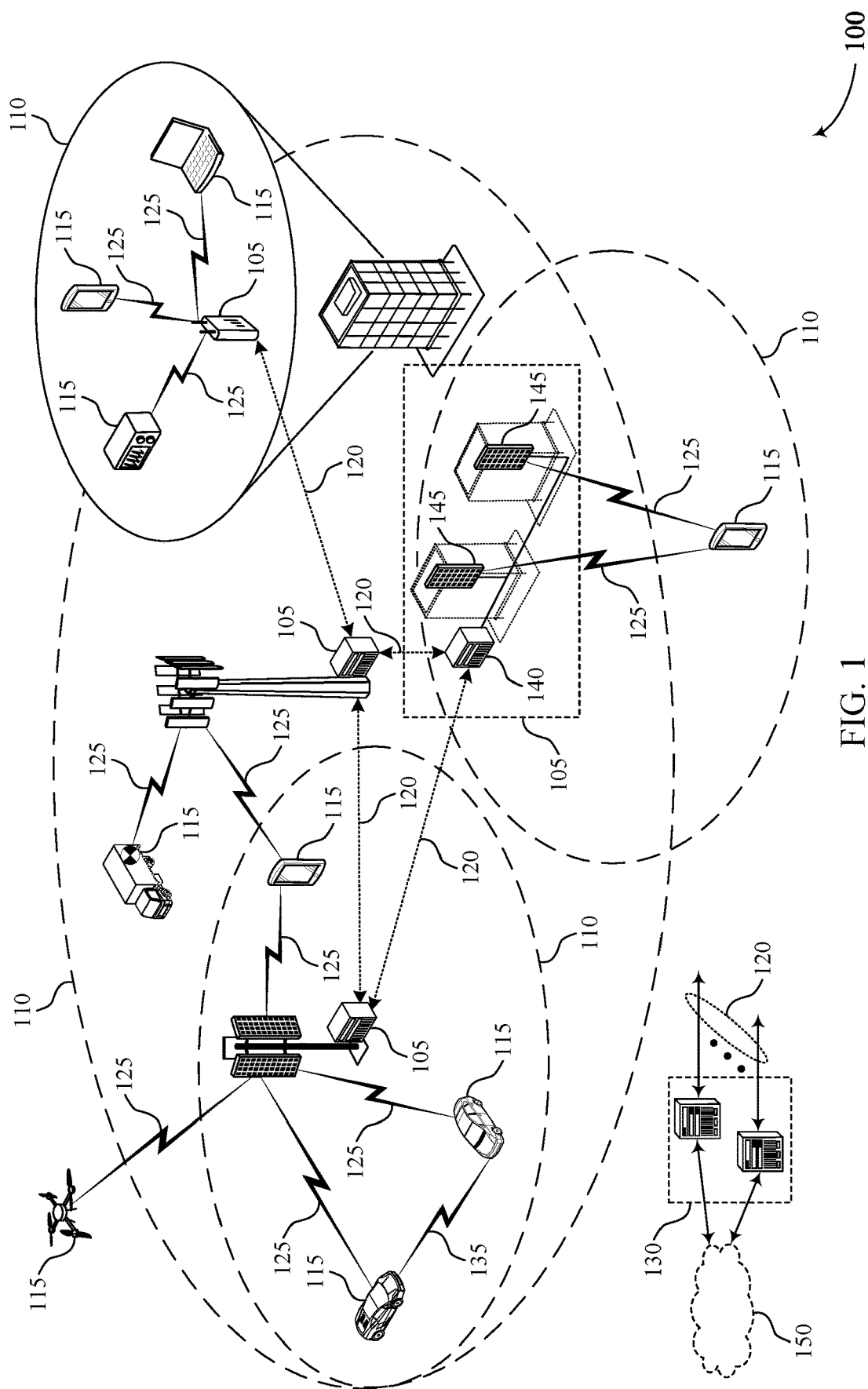
FIG. 1 illustrates an example of a wireless communications system that supports reciprocity reporting for wireless communications systems in accordance with aspects of the present disclosure.

Some wireless communications systems may support channel estimation techniques, which may enable wireless devices to detect and adapt to varying channel conditions. In many cases, wireless devices within wireless communications systems may utilize reference signals to estimate channel conditions, report the characterizations, report channel adjustments to one or more corresponding wireless nodes. In some cases, both uplink and downlink channels may undergo channel estimation to provide reliable communications between two or more wireless nodes by utilizing one or more reference signals used to estimate the efficacy and quality of each channel. For example, a base station may receive one or more reference signals from a user equipment (UE), such as, for example, a sounding reference signal (SRS). The base station may leverage measurements of the SRS to estimate channel conditions of an uplink channel. Similarly, the base station may estimate channel conditions of a downlink channel by utilizing one or more downlink reference signals (e.g., channel state information (CSI) reference signals (RSs)). The UE may report the estimated downlink channel conditions to the base station, where the base station may schedule communications and/or perform one or more channel adjustments based on an uplink channel estimation, a downlink channel estimation, or both. However, the reporting to estimate channel conditions for both uplink and downlink communications can introduce relatively high communications overhead and may also be relatively inefficient (e.g., link adaptation may be relatively poor and result in latency, reduced throughput, etc.).

In accordance with the techniques described herein, the wireless communication system may utilize beam reciprocity to aid in channel estimation. The UE may establish uplink and downlink connections with a base station. In some examples, the UE may indicate a capability of the UE to estimate a channel reciprocity (e.g., as part of a connection establishment procedure). For example, the UE may be capable of using an antenna array configuration corresponding to communications with the base station to estimate a reciprocity parameter that indicates beam similarities between an uplink beam and a downlink beam. The antenna array configuration may include one or more parameters associated with the antenna array, such as a quantity of antennas per link, a quantity of phase shifters per link, an orientation of a downlink beam, an uplink beam, or both, parameters associated with an array structure, or any combination thereof, among other examples of antenna array parameters. In some examples, the UE may transmit a UE performance report message in addition or alternative to the capability of the UE. In some examples, the UE may calculate the reciprocity parameter based on the one or more parameters associated with the antenna array. Additionally or alternatively, the UE may correlate a first power delay profile (PDP) corresponding to uplink communications with a second PDP corresponding to downlink communications. The UE may obtain the reciprocity parameter based on the correlation.

The UE may transmit a report message to the base station indicating the reciprocity parameter. A reciprocity parameter may indicate a degree of similarities between conditions for uplink channels and downlink channels. In some communications systems, a receiving device (e.g., a base station or a UE) may measure channel conditions for a received channel (e.g., an uplink channel or a downlink channel) and then estimate channel conditions of a transmitting channel (e.g., a downlink channel or an uplink channel). When carrier frequencies are in some frequency ranges (e.g., FR2), the amount of similarities (e.g., the reciprocity) between the uplink channels and the downlink channels may vary. In some examples, the reciprocity parameter may indicate a relatively high reciprocity value between the uplink beam and the downlink beam (e.g., the uplink channel conditions and downlink channel conditions may be relatively similar or reciprocal), or the reciprocity parameter may indicate a relatively low reciprocity value (e.g., the uplink channel conditions and downlink channel conditions may be relatively different). For example, the UE may measure a relatively low reciprocity value. In some such examples, the base station may issue a request to adjust the reciprocity between uplink beams and downlink beams. For example, the UE may adjust one or more parameters of the antenna array to increase the reciprocity value between uplink and downlink beams in response to the request. Additionally or alternatively, the base station may transmit a request to the UE to switch from a first transmission reception point (TRP) to a second TRP, which may lead to a relatively higher reciprocity value.

The base station may perform one or more operations based on the received report message indicating the reciprocity parameter. For example, if the reciprocity parameter indicates a relatively high reciprocity between the uplink and downlink channels, the base station may perform channel estimation using the reciprocity parameter. As an illustrative example, the base station may receive a reference signal (e.g., SRS) and estimate an uplink channel using the SRS. The base station may estimate the downlink channel using the uplink channel and the indicated reciprocity parameter. For instance, the base station may determine that the uplink channel conditions are reciprocal to the downlink channel conditions based on a high value of the reciprocity parameter, and the base station may use measurements obtained as part of estimating the uplink channel as measurements for the downlink channel. Thus, the base station may estimate the downlink channel without transmitting reference signals (e.g., CSI-RSs) or waiting for an estimation report from the UE (e.g., a CSI-RS report). In some examples, the base station may cancel or adjust reference signal transmissions and/or a report from the UE. By reducing the quantity or frequency of reference signals or channel state measurement reports from the UE, the wireless communications system may realize reduced signaling overhead and improved efficiency of communications (higher throughput), among other benefits.

Aspects of the disclosure are initially described in the context of wireless communications systems. Aspects of the disclosure are then described in the context of beam arrangements and process flows. Aspects of the disclosure are further illustrated by and described with reference to apparatus diagrams, system diagrams, and flowcharts that relate to reciprocity report for wireless communications systems.

FIG. 1 illustrates an example of a wireless communications system 100 that supports reciprocity reporting for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support reciprocity techniques and reporting as described herein. For example, wireless devices of the wireless communications system 100 may implement channel reciprocity of uplink and downlink beams for channel estimation operations. A UE 115 may identify a reciprocity parameter indicating a reciprocity between a downlink beam and an uplink beam based on a configuration of an antenna array at the UE 115 (e.g., one or more parameters associated with the antenna array), a working frequency, or the like. In other words, the UE 115 may calculate or otherwise determine a degree of overlap or similarity between the downlink beam and the uplink beam. As one example, the UE 115 may correlate a first PDP corresponding to uplink communications with a second PDP corresponding to downlink communications. Additionally or alternatively, the UE 115 may perform a reciprocity calculation to obtain the reciprocity parameter. The UE 115 may indicate the reciprocity parameter via a reciprocity report to the base station 105.

In some examples, the base station 105 may perform channel estimation based on the reciprocity report. For example, the base station 105 may estimate uplink channel conditions based on one or more reference signals from the UE 115. The base station may use the reciprocity parameter and the uplink channel conditions to estimate downlink channel conditions. For example, the base station 105 may identify a relatively high reciprocity parameter, which may indicate that a downlink channel and an uplink channel experience relatively similar conditions. The base station 105 may use the same uplink channel estimation or an adjusted uplink channel estimation for the downlink channel estimation based on a value of the reciprocity parameter, which may enable the base station 105 to estimate the downlink conditions without waiting for the UE 115 to transmit a report indicating the downlink conditions. In some examples, a base station may transmit a request for the UE 115 to reconfigure one or more antennas in an antenna array to increase the reciprocity between uplink and downlink beams. Additionally or alternatively, the base station 105 may transmit a request to the UE 115 to switch from a first TRP to a second TRP, which may lead to a relatively higher reciprocity value. By implementing reciprocity parameters as described herein, the base station 105 and the UE 115 may realize reduced signaling overhead (e.g., the base station 105 may cancel or adjust a CSI-RS reporting) and improved efficiency of communications (e.g., higher throughput), among other benefits.

Figure 2:
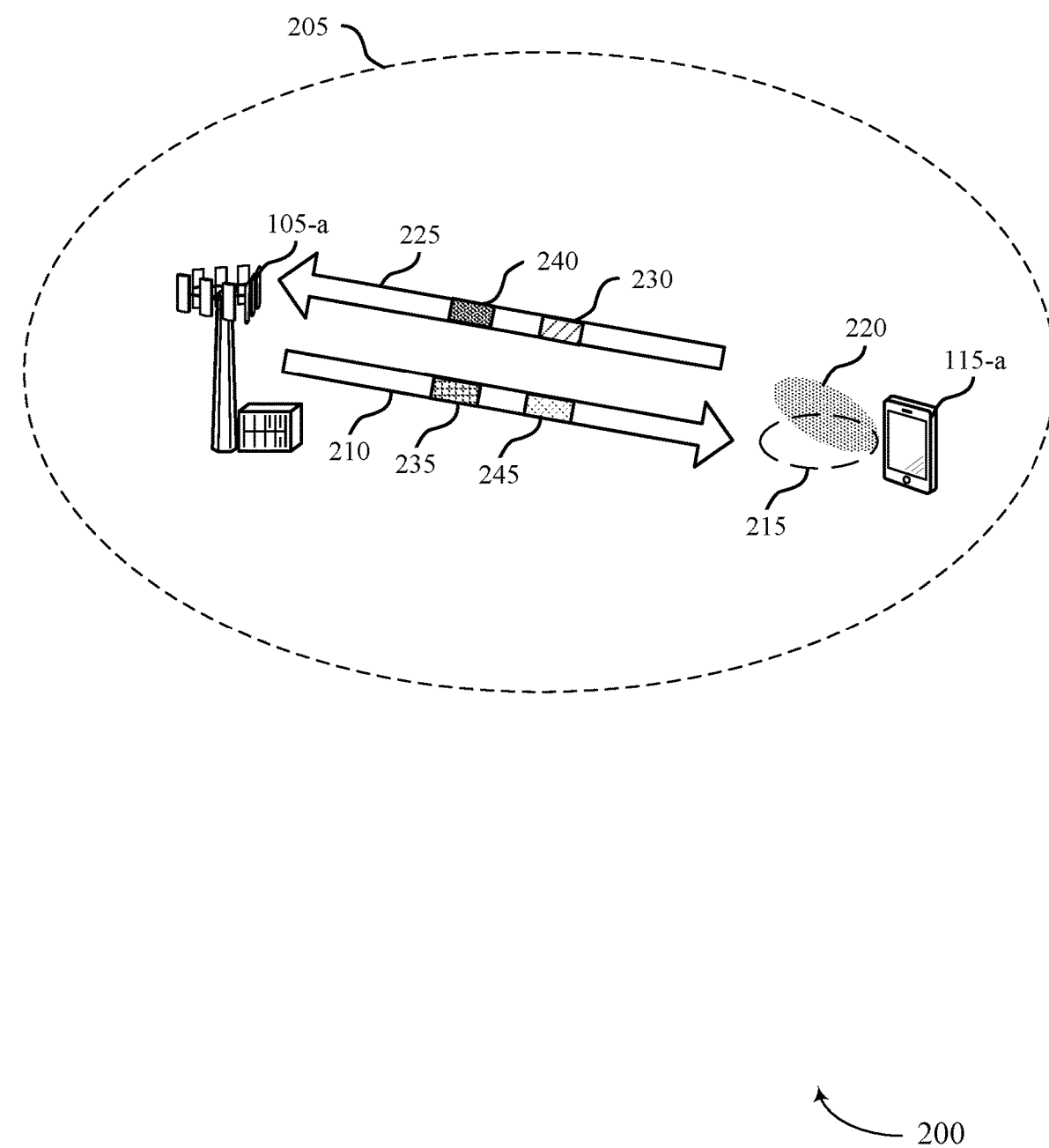
FIG. 2 illustrates an example of a wireless communications system that supports reciprocity reporting for wireless communications systems in accordance with aspects of the present disclosure.

FIG. 2 illustrates an example of a wireless communications system 200 that supports reciprocity reporting for wireless communications systems in accordance with aspects of the present disclosure. The wireless communications system 200 may implement aspects of the wireless communications system 100. For example, the wireless communications system 200 may include a UE 115-a and a base station 105-a, which may be examples of the corresponding devices as described with reference to FIG. 1. Generally, the wireless communications system 200 may illustrate an example of reciprocity reporting as described herein between the base station 105-a and the UE 115-a, although any quantity or type of devices may support the techniques described herein.

The wireless communications system 200 may illustrate an example of the UE 115-a residing in a geographic coverage area 205 corresponding to the base station 105-a. The coverage area 205 may be an example of a coverage area 110 as described with reference to FIG. 1. The UE 115-a and the base station 105-a may communicate over a downlink communication channel 210 and an uplink communication channel 225. The UE 115-a and the base station 105-a may leverage beam reciprocity via a reciprocity report to perform channel estimation. For example, the base station 105-a may estimate the downlink communication channel 210 based on an estimation of the uplink communication channel 225 and a reciprocity parameter indicated via a reciprocity report as described herein. In some examples, the reciprocity report may be applied for carrier frequencies in FR2 and above (e.g., due to a relatively high free space loss which may cause one dominant cluster to arrive at a receiver, such as a cluster correlated to a beam steering shape), although any frequency range may be configured to support the reciprocity techniques described herein. In some frequency ranges of carrier frequencies (e.g., FR1), reciprocity between uplink channels and downlink channels may be assumed by the different devices. In such examples, the base station or the UE may rely on a level of reciprocity between the received channels (e.g., uplink channel or downlink channel) to make estimates about the transmitted channels (e.g., downlink channel or uplink channel).

The base station 105-a may establish the uplink communication channel 225 and the downlink communication channel 210 with the UE 115-a for uplink communications from the UE 115-a and downlink communications from the base station 105-a, respectively. While establishing communications, the base station 105-a or the UE 115-a may select beam parameters for the uplink communication channel 225 and the downlink communication channel 210 to support communicating signals between the base station 105-a and the UE 115-a. For example, the UE 115-a may establish a downlink beam 215 and an uplink beam 220 for communications via the downlink communication channel 210 and the uplink communication channel 225 respectively, although any quantity of beams may be used.

The devices in the wireless communications system 200 may use channel reciprocity to improve performance, coverage, power consumption, or any combination thereof. In some cases, the base station 105-a may estimate an uplink channel for communications from the UE 115-a based on transmitting one or more reference signals, such as SRSs. If the base station determines (e.g., assumes) that the downlink communication channel 210 experiences similar conditions as the uplink communications channel 225 (e.g., the channels have reciprocity), the base station 105-a may obtain a downlink channel estimate using the uplink channel estimation. Such techniques may enable the base station 105-a to schedule communications, for example, without transmitting downlink reference signals and configuring the UE 115-a to estimate the downlink channel conditions and report the estimation, which may improve power consumption, performance, and the like. As an illustrative example, the base station 105-a may determine one or more parameters (e.g., rank indicator (RI), PMI, channel quality indicator (CQI), a modulation and coding scheme (MCS), and the like) for scheduling communications with the UE 115-a. Stated alternatively, the base station 105-a may be enabled to estimate some parameters typically reported by the UE 115-a (or other parameters) based on SRS pilots, which may result in higher report accuracy and resolution (e.g., MCS vs. CQI) and reporting overhead may be saved (e.g., the UE 115-a may not transmit the report for such parameters).

However, in some examples, relatively large time gaps may exist between uplink transmissions which may render channel estimation inaccurate (e.g., in TDD). Accordingly, full duplex may be implemented (e.g., in IAB communication and in base station 105-a to the UE 115-a using SDM, for example, for FR2 and above). In some examples, the uplink beam 220 and the downlink beam 215 may be different or associated with channels experiencing different conditions. For example, a quantity of elements used for uplink compared to a quantity of elements used for downlink (e.g., power considerations) may be different, beam steering may be different, and the like (e.g., other parameters of an antenna configuration for uplink may be different comparted to the antenna configuration for downlink).

In accordance with the techniques described herein, the wireless communications system 200 may support reciprocity estimation and reporting, which may improve communications with the base station 105-a (e.g., improved link adaptation, the UE 115-a may experience reduced overhead by refraining from reporting RI, PMI, CQI, and the like to improve throughput, etc.). For example, the reciprocity report may render a CSI-RS report a redundant procedure, though the UE 115-a may support both the reciprocity report and the CSI-RS report for improved accuracy and consistency. For example, the UE 115-a may receive CSI-RSs from the base station 105-a and estimate downlink channel using the CSI-RSs, and the UE 115-a may transmit a CSI-RS report indicating the estimated downlink channel, one or more parameters, or a combination thereof.

In some cases, the UE 115-a may transmit a control message 230 to the base station 105-a indicating a capability of the UE 115-a, which may include a capability for the UE 115-a to identify a reciprocity parameter between the downlink beam 215 and the uplink beam 220 (or any quantity or types of beams), report the reciprocity parameter, or both. Additionally or alternatively, the UE 115-a may transmit a UE performance report. In some examples, the capability and the performance report may be transmitted in a same control message 230, or in different control messages 230. In some examples, the UE 115-a may transmit the control message 230 as part of a connection establishment procedure. In some cases, the UE performance report may indicate one or more parameters associated with detection or decoding (e.g., maximum likelihood (ML) or linear minimum mean square error (LMMSE) detection, a sequential or non-sequential low-density parity check (LDPC) decider, a number of iterations, or any combination thereof, among other examples of detection or decoding parameters).

Additionally or alternatively, the UE performance report may indicate the performance of the UE per rank in one or more mathematical models (e.g., an additive white gaussian noise model (AWGN)) and the performance in defined channels (e.g., assuming cases with low doppler). Such performance may be referred to as a "gap from capacity." In some examples, the UE performance report may be per rank indicator (RI), MCS, or both, or averaged for all MCS per RI, averaged for all RIs, etc. In some examples, the capability message and/or the UE performance report may enable the base station 105-a to estimate a downlink channel, determine one or more parameters for scheduling communications, improve link adaptation render one or more reference signals utilized for channel estimation redundant (e.g., adjust or cancel reference signals or reporting downlink channel estimation and thus reduce signaling overhead), or any combination thereof.

Thus, the control message 230 may inform the base station 105-*a* of the capabilities of the UE 115-*a* to calculate or otherwise identify a reciprocity parameter indicating a degree of beam overlap between the downlink beam 215 and the uplink beam 220, as described with reference to FIGS. 3 and 4.

In some examples, the base station 105-*a* may transmit a request message 235 requesting a report message 240 (e.g., a reciprocity report) from the UE 115-*a* based on the indicated capability. For example, the base station 105-*a* may request the report message 240 if the control message 230 indicates the UE 115-*a* is capable of reporting a reciprocity parameter corresponding to the degree of overlap of the downlink beam 215 and the uplink beam 220. In some examples, the base station 105-*a* may determine and indicate a first PDP corresponding to the uplink communications channel 225 to the UE 115-*a*. In response to the request message 235, the UE 115-*a* may measure the reciprocity parameter based on communicating signals over the uplink communications channel 225 and the downlink communications channel 210, one or more parameters associated with an array of antennas at the UE 115-*a*, the first PDP, or some combination thereof.

For example, the UE 115-*a* may receive a report indicating the first PDP corresponding to the uplink communications channel 225. The UE 115-*a* may correlate the first PDP with a second PDP corresponding to the downlink communications channel 210 to determine the reciprocity parameter. In some examples, the UE 115-*a* may identify the reciprocity parameter based on a configuration of the array of antennas at the UE 115-*a*. Specifically, the UE 115-*a* identify one or more parameters associated with the array of antennas to aid in the identification or calculation of the reciprocity parameter between the uplink beam 220 and the downlink beam 215. For example, the UE 115-*a* may identify a quantity or configuration of antennas per link (e.g., per the downlink, the uplink, or both), a quantity or configuration of a set of phase shifters per link, one or more amplitude modulators, or other parameters for receiving data over the downlink beam 215 and transmitting data over the uplink beam 220. That is, the UE 115-*a* may use the parameters (i.e., knowledge of an array structure and antenna parameters, a working frequency for one or more links, and the like) to determine a degree of beam overlap between the uplink beam 220 and the downlink beam 215 (e.g., an overlap between the footprint or beam coverage of each beam). The degree of overlap may indicate a reciprocity between the beams.

Based on the determined reciprocity parameter, the UE 115-*a* may transmit a report message 240 to the base station 105-*a* indicating the reciprocity parameter between the downlink communications channel 210 and the uplink communications channel 225 (e.g., the downlink beam 215 and the uplink beam 220). In some examples, the report message 240 may include an indication of a value of the reciprocity (e.g., a value between 0 and 1 where 1 indicates full reciprocity and 0 indicates no reciprocity), a category of the reciprocity (e.g., a flag in the message may indicate a high reciprocity, a medium reciprocity, a low reciprocity), and indication of whether the reciprocity satisfies a threshold (e.g., the UE 115-*a* may determine that the estimated reciprocity parameter satisfies a threshold and include an indication in the report message 240 that channel reciprocity may be used to estimate channel conditions), or any combination thereof.

The base station 105-*a* may determine the reciprocity parameter from the report message 240 and perform one or more actions based on the parameter. In some examples, the base station 105-*a* may identify a reciprocity threshold (e.g., a pre-configured or determined threshold for whether the reciprocity parameter may be used for channel estimation). If the reciprocity parameter satisfies the reciprocity threshold, the base station 105-*a* may utilize the reciprocity parameter to conduct channel estimation. For example, the base station 105-*a* may receive one or more SRSs (e.g., pilots of the SRSs) and estimate the uplink channel. The base station 105-*a* may use the estimated uplink channel and the reciprocity parameter to estimate the downlink channel if the parameter satisfies the threshold (e.g., the base station 105-*a* may use the measurements of the uplink channel and assume the downlink channel is experiencing the same or similar conditions and thus use the measurements for the downlink channel).

In some examples, estimating channel conditions using the reciprocity parameter from the report message 240 may render one or more reference signals used for channel estimation redundant. For example, the base station 105-*a* may transmit a request message 245 including an indication to cancel or adjust the use of one or more reference signals over the downlink communications channel 210 based on the reciprocity parameter. For example, the base station 105-*a* may reduce a frequency of downlink reference signals (e.g., CSI-RSs) or cancel the reference signals due to a relatively high reciprocity enabling the base station 105-*a* to estimate the downlink channel without waiting for a CSI report (e.g., the base station 105-*a* may additionally or alternatively cancel the CSI report or reduce a frequency of occurrences for the CSI report). In some examples, the cancellation or adjustment of the one or more reference signals may improve overall link adaptation by enhancing throughput and reducing latency (e.g., reducing a probability for utilizing HARQ).

In some examples, the reciprocity parameter may fail to satisfy the reciprocity threshold. In some such examples, the base station 105-*a* may transmit one or more requests to adjust one or more parameters at the UE 115-*a* to increase the reciprocity parameter, to transmit a reciprocity report, or both. For example, if the reciprocity parameter fails to satisfy the defined threshold, the base station 105-*a* may transmit a request message 245 to the UE 115-*a* requesting the adjustment of one or more parameters associated with the array of antennas (e.g., a set of phase shifters, amplitude modulators, etc.) at the UE 115-*a*. The UE 115-*a* may change a configuration of the uplink beam 220 or the downlink beam 215 to improve the reciprocity (e.g., increase an overlap between the beams or channels) in accordance with the request message 245. Additionally or alternatively, the UE 115-*a* may transmit a second report message indicating a second reciprocity parameter (e.g., an improved or higher reciprocity parameter based on the adjustments). In some cases, the request message 245 may include an indication for the UE 115-*a* to switch from a second transmission reception point (TRP) to a first TRP, or the base station 105-*a* may switch one or more TRPs for the uplink or downlink communications. Stated alternatively, in some examples the base station 105-*a* may change an uplink beam or downlink beam (at either device) to match a same TRP (e.g., a same TRP may be used for both links and the base station 105-*a* may indicate which beam or TRP is desired), which may improve the reciprocity of the uplink and downlink channels.

Figure 3:
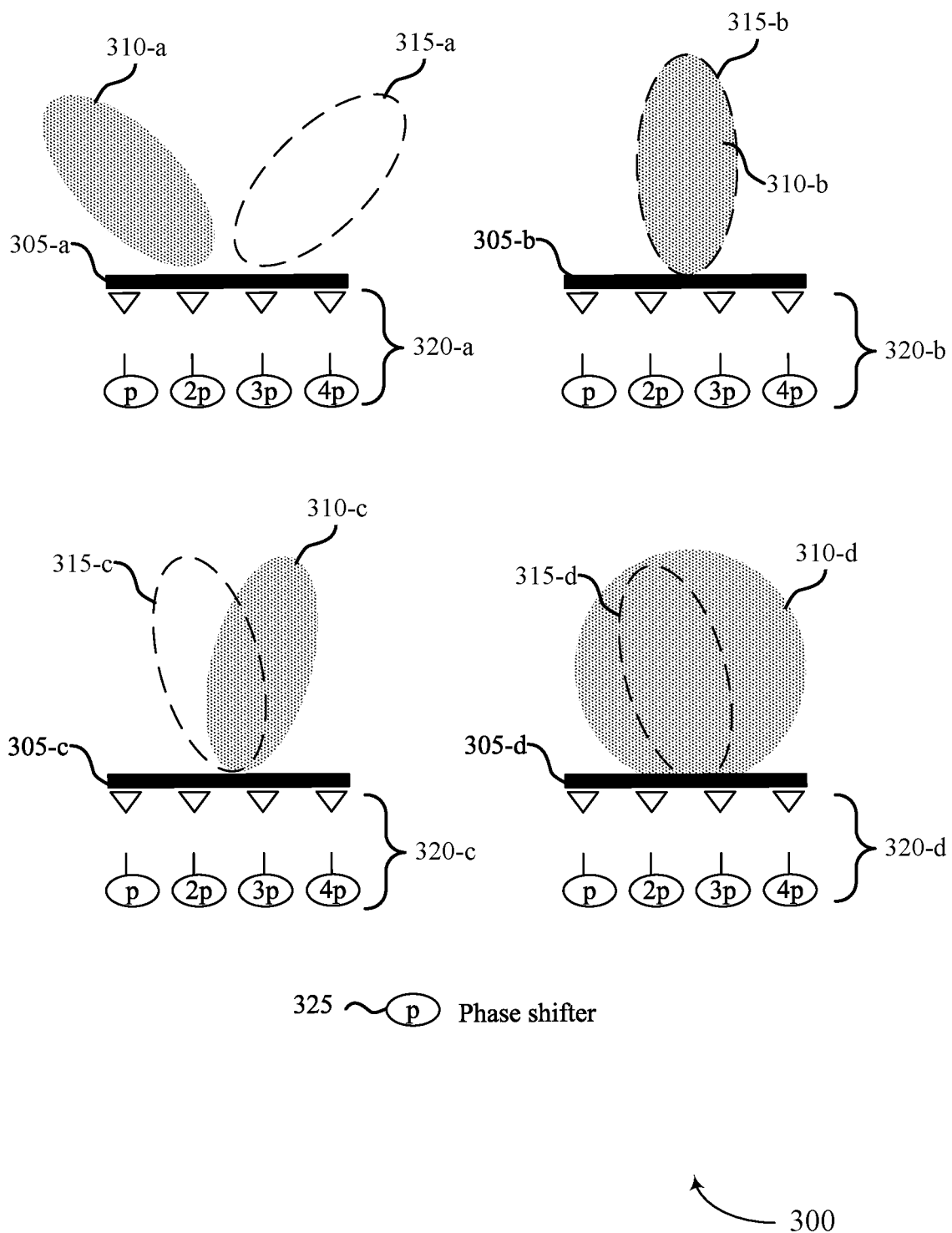
FIGS. 3 and 4 illustrate examples of beam arrangements that support reciprocity reporting for wireless communications systems in accordance with aspects of the present disclosure.

FIG. 3 illustrates an example of beam arrangements 300 that support reciprocity reporting for wireless communications systems in accordance with aspects of the present disclosure. In some examples, the beam arrangements 300 may implement, or may be implemented by, aspects of a wireless communications system as described with reference to FIGS. 1 and 2. For example, the beam arrangements 300 may be implemented by a UE 115 or a base station 105, which may be examples of the corresponding devices as described with reference to FIGS. 1 and 2, although any wireless device may implement the techniques described herein. In some examples, beam arrangements 300 may be referred to as beam configurations.

The beam arrangements 300 may illustrate examples of different beam configurations and reciprocity between uplink beams 310 and downlink beams 315 (e.g., reciprocity of a downlink channel for communications via downlink beams 315 and an uplink channel for communications via uplink beams 310). While four configurations are shown for illustrative clarity, it is to be understood that any beam combination, beam angles, beam frequencies, or the like are valid beam arrangements and may be implemented by the devices as described herein. For example, each antenna array 305 may show 4 phase shifters 320 and 4 antenna elements, but any quantity may be used instead.

As a first example, an antenna array 305-a may transmit uplink communications over an uplink beam 310-a and receive downlink communications over a downlink beam 315-a. The antenna array 305-a may configure one or more parameters associated with the array in support of directional beam forming. For example, the antenna array 305 may select parameters for the phase shifters 325 among other parameters (e.g., a quantity of antenna elements) to perform beam steering. For instance, each phase shifter 325 in the phase shifters 320-a may be assigned a weight such that the antenna array 305-a produces directed beams through constructive and destructive interference. In other words, the one or more parameters corresponding to the set of phase shifters 320-a may enable the antenna array 305-a to form beams with a given directionality, differing widths of beams, to steer beams by altering the given directionality, or a combination thereof. Additionally or alternatively, the wireless device may configure varying quantities of antenna elements per link to modify a power, shape, coverage, or the like of the beams.

In the example of the antenna array 305-a, the uplink beam 310-a and downlink beam 315-a may not overlap and the reciprocity parameter may be 0. That is, the array configuration (e.g., one or more parameters associated with the antenna array 305-a) may result in channel conditions of the uplink beam 310-a and the downlink beam 315-a having relatively little or no reciprocity. In the example of antenna array 305-b, the uplink beam 310-b and the downlink beam 315-b may fully overlap and the reciprocity parameter may be 1. For example, the array configuration (e.g., one or more parameters associated with the antenna array 305-b) may result in channel conditions of the uplink beam 310-b and the downlink beam 315-b having relatively full reciprocity (e.g., the channels may experience similar or the same conditions and an estimation of the channel for one of the beams may be applied to the other beam based on the reciprocity of 1).

The examples of antenna arrays 305-c and 305-d may illustrate reciprocity values between 0 and 1. For example, the antenna array 305-c may correspond to a configuration such that the beams may share a similar but not the same channel (e.g., partial reciprocity such as a reciprocity value of 0.7). Additionally, the antenna array 305-d may correspond to a configuration such that the beams overlap, but due to a different quantity of elements per link (e.g., more elements utilized for the uplink beam 310-d), the channel conditions may share some similarities but the beams may not experience the same channel conditions.

In some examples, a first device corresponding to the antenna array 305-a may receive a request from a second device to transmit a reciprocity report, as discussed herein. The first device may generate the reciprocity report based on a measured reciprocity parameter. For example, the first device may identify a reciprocity parameter of 0 based on the one or more parameters of the antenna array 305-a resulting in a lack of overlap of the uplink beam 310-a and the downlink beam 315-a. The first device may report the reciprocity parameter to the second device. In some examples, upon receipt of the reciprocity report, the second device may transmit a request to the first device to alter one or more parameters with respect to the antenna array 305-a to increase the reciprocity parameter (e.g., beam overlap). For example, the first device may alter one or more parameters of the set of phase shifters 320-a to alter the directivity of the downlink beam 315-a such that the uplink beam 310-a and the uplink beam 310-a subsequently overlap (e.g., as shown in the antenna array 305-b).

In some examples, the antenna array 305-b may be configured such that the uplink beam 310-b and the downlink beam 315-b may overlap to a relatively large degree (e.g., fully overlap). For example, a set of phase shifters 320-b may form one or more directional beams via a set of configured weights that result in both the uplink beam 310-b and the downlink beam 315-b overlapping. In some examples, a first device corresponding to the antenna array 305-b may receive a request from a second device to transmit a reciprocity report, as discussed in FIG. 2. The second device may identify a reciprocity parameter for use in the reciprocity report. In some cases, the second device may determine the reciprocity parameter by measuring a quantity of antennas associated with the antenna array 305-b that correspond to a respective access link, the set of phase shifters 320-b, or a combination thereof. As illustrated by the antenna array 305-b and further by the uplink beam 310-b and the downlink beam 315-b, the first device may determine that both the uplink beam 310-b and the downlink beam 315-b overlap or that the reciprocity parameter satisfies a threshold. Based on the determination, the first device may report the reciprocity parameter in the reciprocity report requested by the second device.

As another example, an antenna array 305-c illustrates an uplink beam 310-c and a downlink beam 315-c exemplifying a reciprocity value between 0 and 1. Specifically, the antenna array 305-c may assign one or more parameters to a set of phase shifters 320-c such that the directivity of the uplink beam 310-c and the downlink beam 315-c partially overlap. In such cases where a first device, corresponding to the antenna array 305-c, receives a reciprocity report request from a second device, the first device may perform one or more measurements to obtain a reciprocity parameter indicating the degree of overlap between the uplink beam 310-c and the downlink beam 315-c. For example, the first device may calculate the reciprocity parameter based on a first directivity of the downlink beam 315-c and a second directivity of the uplink beam 310-c, power parameters associated with each beam, or any combination thereof. Thus, first device may compute or estimate the reciprocity parameter corresponding to the degree of overlap between the uplink beam 310-c and the downlink beam 315-c. As illustrated by the antenna array 305-c, the first device may determine a reciprocity parameter between 0 and 1 (e.g., 0.8), as the uplink beam 310-c and the downlink beam 315-c partially overlap (e.g., experience similar but not the same channel conditions).

As yet another example, an antenna array 305-d illustrates an uplink beam 310-d and a downlink beam 315-d exemplifying an arrangement where both beams overlap, however, the uplink beam 310-d has a different beam width than the downlink beam 315-d. Differing beam widths between the uplink beam 310-d and the downlink beam 315-d may occur for multiple reasons. For example, one or more parameters corresponding to a set of phase shifters 320-d may result in differing beam widths. In some cases, a working frequency of the uplink beam 310-d may differ from a working frequency of the downlink beam 315-d. In other cases, free space attenuation and diffraction may result in beam spreading, which may ultimately result in beam width differences at the antenna array 305-d. Whether beam width differences arise from attenuation, diffraction, different parametrizations at the antenna array 305-d, different working frequencies, a combination thereof, or other related phenomena, a first device may still be capable of computing a reciprocity parameter corresponding to the degree of overlap of the uplink beam 310-d and the downlink beam 315-d.

The first device may identify a reciprocity parameter for a respective beam configuration for an uplink beam 310 and downlink beam 315. For example, the first device may determine the reciprocity parameter via a PDP correlation. The first device may identify a PDP of a downlink channel via one or more measurements. Additionally or alternatively, the first device may identify a PDP of an uplink channel (e.g., the second device may report the PDP of the uplink channel to the first device). The first device may correlate the power profiles (e.g., the first device may identify a value of 1 for the reciprocity of the profiles are the same or a 0 if they are relatively different).

Additionally or alternatively, the first device may calculate the reciprocity parameter based on one or more mathematical operations associated with the directivities of the beams. For example, the first device may integrate a multiplication of the directivity of the uplink beam 310-c and the downlink beam 315-c. In some such examples, the first device may measure the directivity, power, etc., of each beam across the surface of a sphere. In other words, the first device may perform a mathematical operation that adds together the power of each respective beam over all possible directions, resulting in a numerical representation of the beam strength, beam width, and beam directivity of both the uplink beam 310 and the downlink beam 315. Such a calculation for determining the reciprocity of the beams may be done in accordance with the example of Equation 1:

$$\frac{\int_{s \in C} P_{RxBeam}(s) \cdot P_{TxBeam}}{\sqrt{\int_{s \in C} P_{RxBeam}^2(s) \cdot P_{TxBeam}^2}} \quad (1)$$

In Equation 1, C may represent a unit sphere, $P_{RxBeam}(s)$ may represent the directivity of the uplink beam 310, $P_{TxBeam}$ may represent the directivity of the downlink beam 315, and s may represent a parameter that sweeps the unit sphere C. In some examples, such an equation may be implemented for a range of conditions, and a look-up table may be pre-configured at the first device. The table may include mappings between various configurations and corresponding reciprocity parameter values (e.g., the first identify may look up a set of parameters of an antenna array 305 for the uplink beam and downlink beam, and the table may include an entry with a correspondence between the set of parameters and the value obtained from the equation). However, it is to be understood that any other method for identifying a reciprocity parameter may be used (e.g., other methods that include channel knowledge or beam knowledge).

Thus, the first device may obtain a reciprocity parameter estimating the reciprocity (e.g., a degree of overlap in power and/or direction) between the uplink beam 310 and the downlink beam 315 based on the beam configuration. By reporting the reciprocity parameter as described herein, the second device may utilize one or more reference signals received from the first device, along with the reciprocity parameter, to conduct channel estimation for both an uplink communications channel and a downlink communications channel, although such techniques may be applied to any devices or channels. For example, although described herein as a UE estimating a reciprocity and reporting a parameter to a base station to enable the base station to estimate downlink channel conditions, the base station may report a reciprocity parameter for the UE to estimate uplink channel conditions, or multiple UEs may communicate via sidelink communications and the UEs may estimate reciprocity for a set of beams and report the reciprocity.

Figure 4:
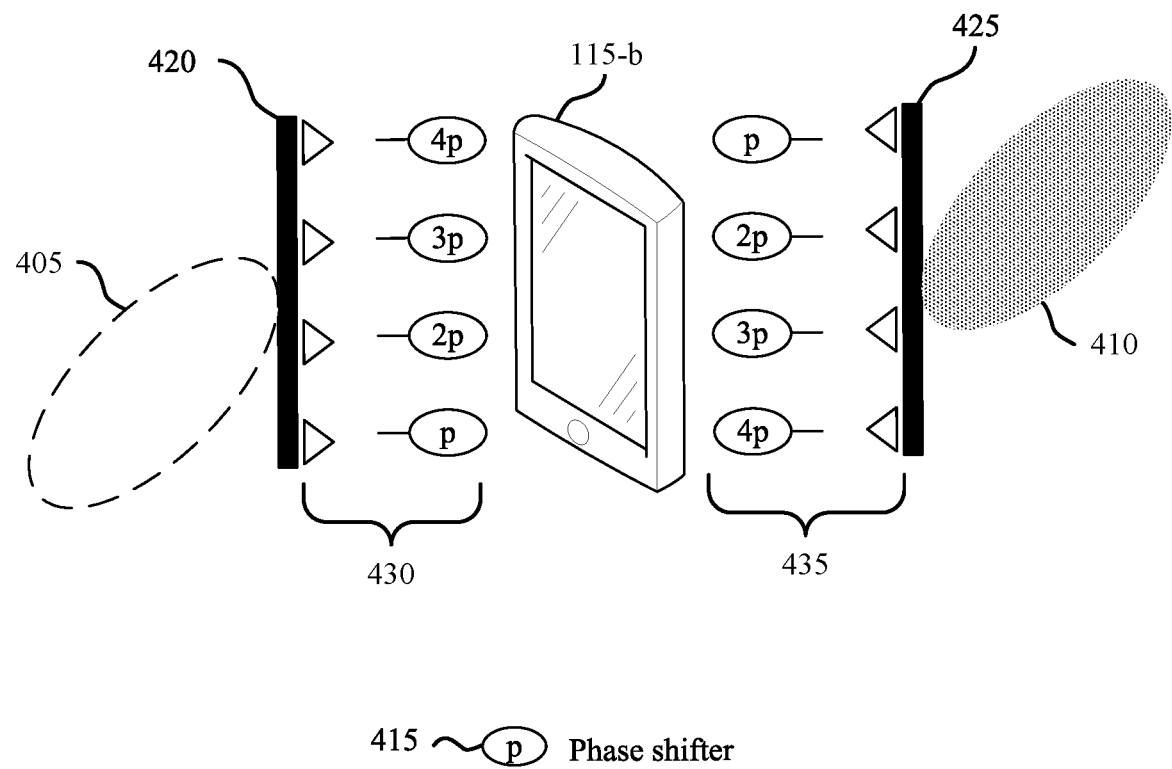

FIG. 4 illustrates an example of a beam arrangement 400 that supports reciprocity reporting for wireless communications systems in accordance with aspects of the present disclosure. In some examples, the beam arrangement 400 may implement, or may be implemented by, aspects of a wireless communications system as described with reference to FIGS. 1 and 2. For example, the beam arrangement 400 may be implemented by a UE 115 or a base station 105, which may be examples of the corresponding devices as described with reference to FIGS. 1 and 2, although any wireless device may implement the techniques described herein. In some examples, beam arrangement 400 may be referred to as a beam configuration. Generally, the beam arrangement 400 may illustrate an example beam configuration for a UE 115-b with multiple antenna arrays.

In some examples, the multiple antenna arrays may be utilized for uplink and downlink communications. The beam arrangement 400 exemplifies a scenario where two antenna arrays within the UE 115-b conduct signaling operations utilizing both uplink and downlink beams. While an example of multiple antenna arrays is illustrated by the beam arrangement 400, any number of antenna arrays, beam combinations, beam angles, beam frequencies, or the like are valid beam arrangements and fully apply to aspects of the present disclosure.

In some examples, a downlink beam 405 may be formed using a first configuration of a first antenna array 420 associated with the UE 115-b. The first configuration may be a configuration as described with reference to FIG. 3. For example, the first configuration may include one or more parameters associated with the antenna array 420 (e.g., a set of phase shifters 430 may correspond to one or more weights or parameters assigned to one or more phase shifters 415 within the set of phase shifters 430). The one or more parameters may result in forming a directional downlink beam 405 associated with one or more working frequencies, a beam width, a beam directivity, and the like.

Similarly, an uplink beam 410 may originate from a second antenna array 425 associated with the UE 115-*b*. The second antenna array 425 may maintain a second configuration corresponding to a second set of one or more parameters of the array 425. In some examples, as shown, the UE 115-*b* may communicate via two different TRPs (e.g., the first antenna array 420 may be an example of a first TRP and the second antenna array 425 may be an example of a second TRP). Due to the configurations of the beams resulting in an uplink beam 410 and a downlink beam 405 with relatively no overlap and operating via different TRPs, a reciprocity of the beams may be relatively low (e.g., 0). Therefore, if a base station requests a reciprocity report from the UE 115-*b* pertaining to the uplink beam 410 and the downlink beam 405, the UE 115-*b* may calculate a reciprocity parameter of 0 and indicate the reciprocity parameter to the base station via the reciprocity report.

In some examples, the UE 115-*b* may utilize multiple data streams (e.g., PDSCH streams, working streams, and the like) corresponding to multiple TRPs. Stated alternatively, in a multi-TRP framework the quantity of PDSCH streams may be larger than 1. In such cases, the UE 115-*b* may receive multiple downlink communications over multiple downlink beams. For example, the UE 115-*b* may receive two physical downlink control channel (PDSCH) streams, where a first PDSCH stream corresponds to a first TRP and a second PDSCH stream corresponds to second TRP, although any quantity of TRPs and PDSCH streams may be used. In some examples, the reciprocity report may be requested per data stream. For example, a base station may request a reciprocity report per data stream in a multi-TRP situation. Accordingly, the UE 115-*b* may identify a first reciprocity parameter corresponding to a first data stream (e.g., the UE 115-*b* may calculate the first reciprocity parameter associated with communications with a first TRP corresponding to the first data stream), the UE 115-*b* may identify a second reciprocity parameter corresponding to a second data stream (e.g., the UE 115-*b* may calculate the second reciprocity parameter associated with communications with a second TRP corresponding to the second data stream), and so on. In other words, the UE 115-*b* may calculate a reciprocity report per working stream. The UE 115-*b* may report the reciprocity parameters for each data stream as described herein. In some examples, the UE 115-*b* may indicate the multiple parameters associated with a respective working stream in a single report message, or the UE 115-*b* may transmit multiple report messages indicating a subset of the multiple parameters.

In some such examples, the base station may request the UE 115-*b* adjust one or more parameters of the antenna array 420 and the antenna array 425 such that a reciprocity between the uplink beam 410 and the downlink beam 405 may be increased. For example, the base station may request that a same TRP be used for both uplink and downlink communications (e.g., the UE 115-*b* may configure the uplink beam 410 to be at a same or similar location as the downlink beam 405 at the antenna array 425).

The UE 115-*b* may conduct signaling operations with the base station with both beams supported by the antenna array 420. In some cases, the base station may request a second reciprocity report from the UE 115-*b*. In response to the request, the UE 115-*b* may identify a second reciprocity parameter associated with the adjusted beams, which may now share a common antenna array 425. The adjusted configuration of the uplink beam 410 and the downlink beam 405 may result in a relatively higher reciprocity parameter that the UE 115-*b* may report to the base station. The base station may receive the second reciprocity report from the UE 115-*b* and determine that the second reciprocity parameter satisfies a threshold. Based on the satisfaction of the threshold, the base station may cancel the use of one or more reference signals and conduct channel estimation of both uplink and downlink communications utilizing uplink communications and the reciprocity report, as described herein.

Figure 5:
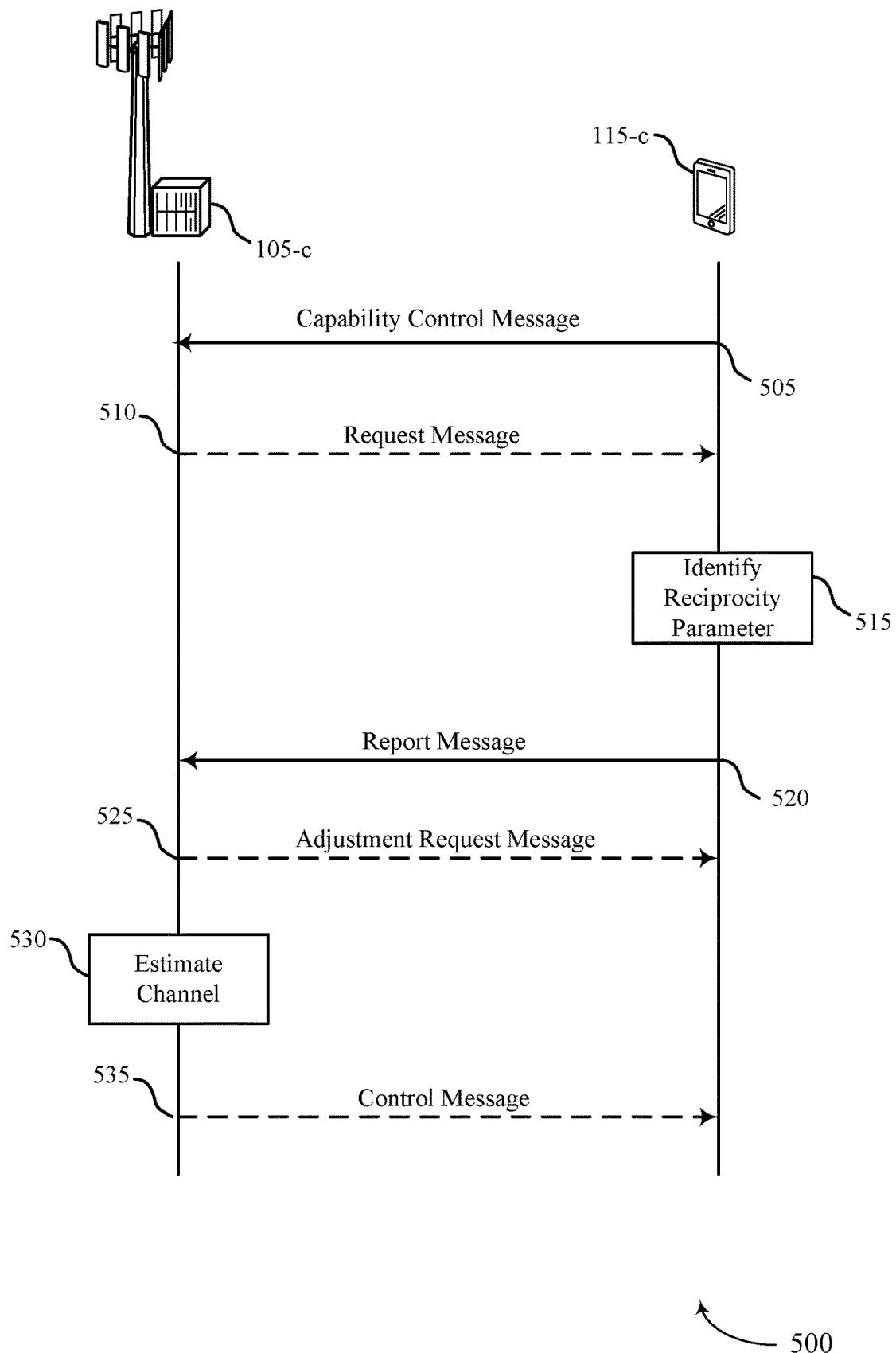
FIG. 5 illustrates an example of a process flow that supports reciprocity reporting for wireless communications systems in accordance with aspects of the present disclosure.

FIG. 5 illustrates an example of a process flow 500 that supports reciprocity reporting for wireless communications systems in accordance with aspects of the present disclosure. The process flow 500 may implement aspects of the wireless communications system 100, the wireless communications system 200, the beam arrangements 300 or 400, or any combination thereof as described with reference to FIGS. 1-4. In some examples, the process flow 500 may include example operations associated with a UE 115-*c* and a base station 105-*c*, which may be examples of corresponding devices described with reference to FIGS. 1-4. In the following description of the process flow 500, the operations between the various devices may be performed in a different order than the example order shown, or the operations performed by the devices may be performed in different orders or at different times. Some operations may also be omitted from the process flow 500, and other operations may be added to the process flow 500.

The base station 105-*c* and the UE 115-*c* may establish communication links for uplink communications, downlink communications, or both. At 505, the UE 115-*c* may report, to the base station 105-*c*, a capability to estimate channel reciprocity (e.g., in a radio resource control (RRC) message or another control message). For example, the UE 115-*c* may transmit a control message as described herein with reference to FIG. 2. Such a message may indicate or include the capability to support reciprocity reporting, a UE performance report, or a combination thereof. After the communication link is established, the UE 115-*c* may be configured with a quantity of antennas per link, a quantity of dedicated phase shifters per link, and the like, among other examples of array parameters.

In some examples, at 510 the base station 105-*c* may transmit a request message for a reciprocity report based on the capability of the UE 115-*c*. At 515, the UE 115-*c* may identify a reciprocity parameter as described herein with reference to FIG. 3. For example, the UE 115-*c* may calculate the parameter or any other method for determining a reciprocity of an uplink beam and a downlink beam based on one or more parameters associated with an antenna array.

At 520, the UE 115-*c* may transmit a report message as described herein. For example, the UE 115-*c* may transmit a report message indicating the reciprocity parameter (e.g., in response to the request message at 510). Additionally or alternatively, the UE 115-*c* may transmit one or more reference signals (e.g., SRSs, pilots of SRSs, etc.) to the base station 105-*c*. The base station 105-*c* may receive the report message from the UE 115-*c*. In some examples, the report message may include an indication of a reciprocity parameter between 0 and 1, where 0 indicates relatively low reciprocity (e.g., no beam overlap between an uplink beam and a downlink beam) and where 1 indicates a relatively high reciprocity (e.g., complete beam overlap). In some examples, the reciprocity parameter may indicate a high amount of beam reciprocity or a low amount of beam reciprocity or that a reciprocity satisfies a threshold as described with reference to FIG. 2. The reciprocity report may include other indications of the reciprocity parameter between the uplink beam and the downlink beam and may not be limited to any numerical range or categorical classification.

In some examples, at 525 the base station 105-c may transmit an adjustment request message. For example, the base station 105-c may determine if the reciprocity parameter satisfies one or more thresholds. If the reciprocity parameter fails to satisfy the threshold (e.g., in the case that a relatively small reciprocity parameter is reported), the base station 105-c may transmit the request message indicating one or more actions or configurations for the UE 115-c to improve the reciprocity. As an illustrative example, the base station 105-c may request phase shifter adjustments for the antenna array at the UE 115-c. Additionally or alternatively, in the case that the uplink beam and the downlink beam are not communicating with a common TRP, or if altering one or more TRPs may increase the reciprocity parameter, the base station 105-c may adjust the uplink beam or the downlink beam to match the same TRP. The UE 115-c may implement the determined adjustments. In some examples, the UE 115-c may report a second reciprocity parameter using the adjusted one or more parameters or TRPs. In some examples, the base station 105-c may compare the second parameter to the threshold and repeat such operations until the threshold is satisfied, or the base station 105-c may determine to refrain from using reciprocity for channel estimation and instead rely on a CSI-RS report from the UE 115-c.

In some other examples, the reciprocity parameter may satisfy the threshold (e.g., in the cases where an initial reciprocity parameter satisfies a threshold, or a subsequent reciprocity parameter satisfies a threshold following one or more adjustments). At 530, the base station 105-c may estimate one or more channels. For example, the base station 105-c may use reference signals (e.g., SRSs) from the UE 115-c to estimate an uplink channel, and then use the estimated uplink channel (e.g., one or more channel measurements of the uplink channel) and the reciprocity parameter to estimate the downlink channel. For example, the base station 105-c may use the same or adjusted one or more uplink channel measurements as the downlink channel measurements (e.g., the base station 105-c may adjust the measurements if a reciprocity is less than 1, or the base station 105-c may use the same measurements if the reciprocity parameter satisfies a threshold).

In some examples, the base station 105-c may determine to cancel or adjust one or more reference signals, reports, or both. For example, the base station 105-c may determine to cancel or reduce a frequency of CSI-RSs or CSI-RS reports based on the reciprocity report and the UE performance report (e.g., received during connection establishment). In such examples, at 535 the base station 105-c may send a control message configuring UE 115-c to cancel or adjust a configuration for the reference signals or reports.

The base station 105-c may perform one or more operations based on the estimated channels. For example, the base station 105-c may use the estimated downlink channel and a reported signal-to-noise and interference ratio (SINR) to calculate a best RI, PMI, and MCS for the UE 115-c. As an illustrative example, the base station 105-c may simulate if the UE 115-c may pass a cyclic redundancy check (CRC) when applying an estimated channel on a set of time domain data, which may be determined via different RI, PMI, and CQI. The base station 105-c may also add AWGN over the simulated signal in accordance with the reported SINR. The base station 105-c may test various hypotheses with multiple noise instances to collect statistics with varying permutations of RI, PMI, and CQI hypotheses to find the best estimation. In some cases, the base station 105-c may utilize traffic over a physical uplink shared channel (PUSCH) for channel estimation. If a PUSCH transmission is not received, the base station 105-c may request the UE 115-c to send a sounding reference signal (SRS) with only pilots for reports information. In some examples, the base station 105-c may, instead, reconfigure CSI-RS.

Figure 6:
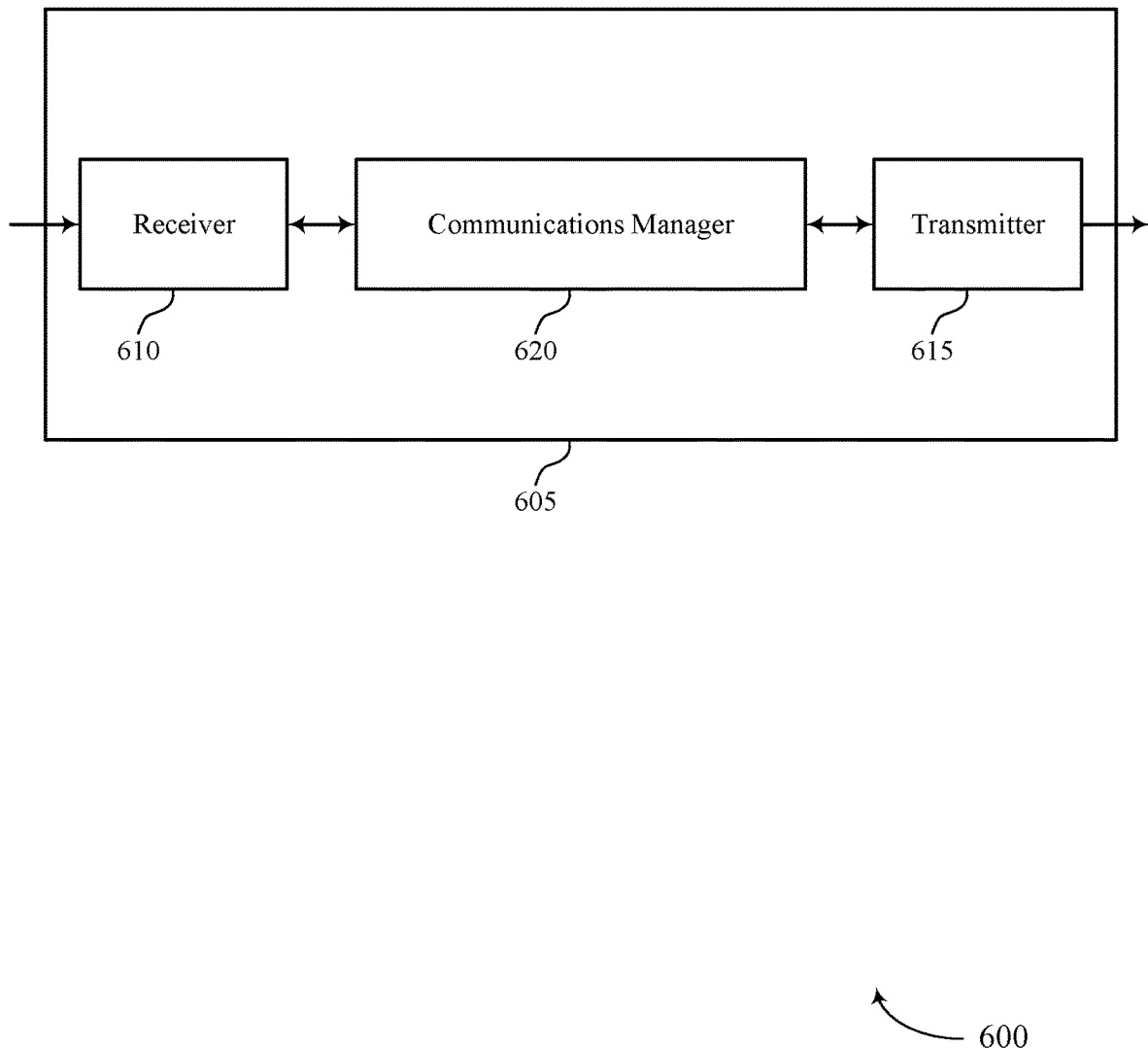
FIGS. 6 and 7 show block diagrams of devices that support reciprocity reporting for wireless communications systems in accordance with aspects of the present disclosure.

FIG. 6 shows a block diagram 600 of a device 605 that supports reciprocity reporting for wireless communications systems in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reciprocity report for wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reciprocity report for wireless communications systems). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reciprocity report for wireless communications systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for transmitting, to a base station, a control message indicating a capability of the UE to identify a reciprocity parameter between downlink communications and uplink communications of a channel between the UE and the base station. The communications manager 620 may be configured as or otherwise support a means for communicating signals over the channel using an array of antennas of the UE based on transmitting the control message. The communications manager 620 may be configured as or otherwise support a means for transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for identifying a reciprocity parameter, reporting the reciprocity parameter, or both. By implementing such a reciprocity parameter, a modem or processor of the device 605 may realize one or more potential advantages. For example, a base station may be enabled to reduce a frequency of reference signals or cancel a CSI-RS report at the device 605, which may result in reduced processing, reduced power consumption, more efficient utilization of communication resources (e.g., increased throughput), or any combination thereof at the device 605.

Figure 7:
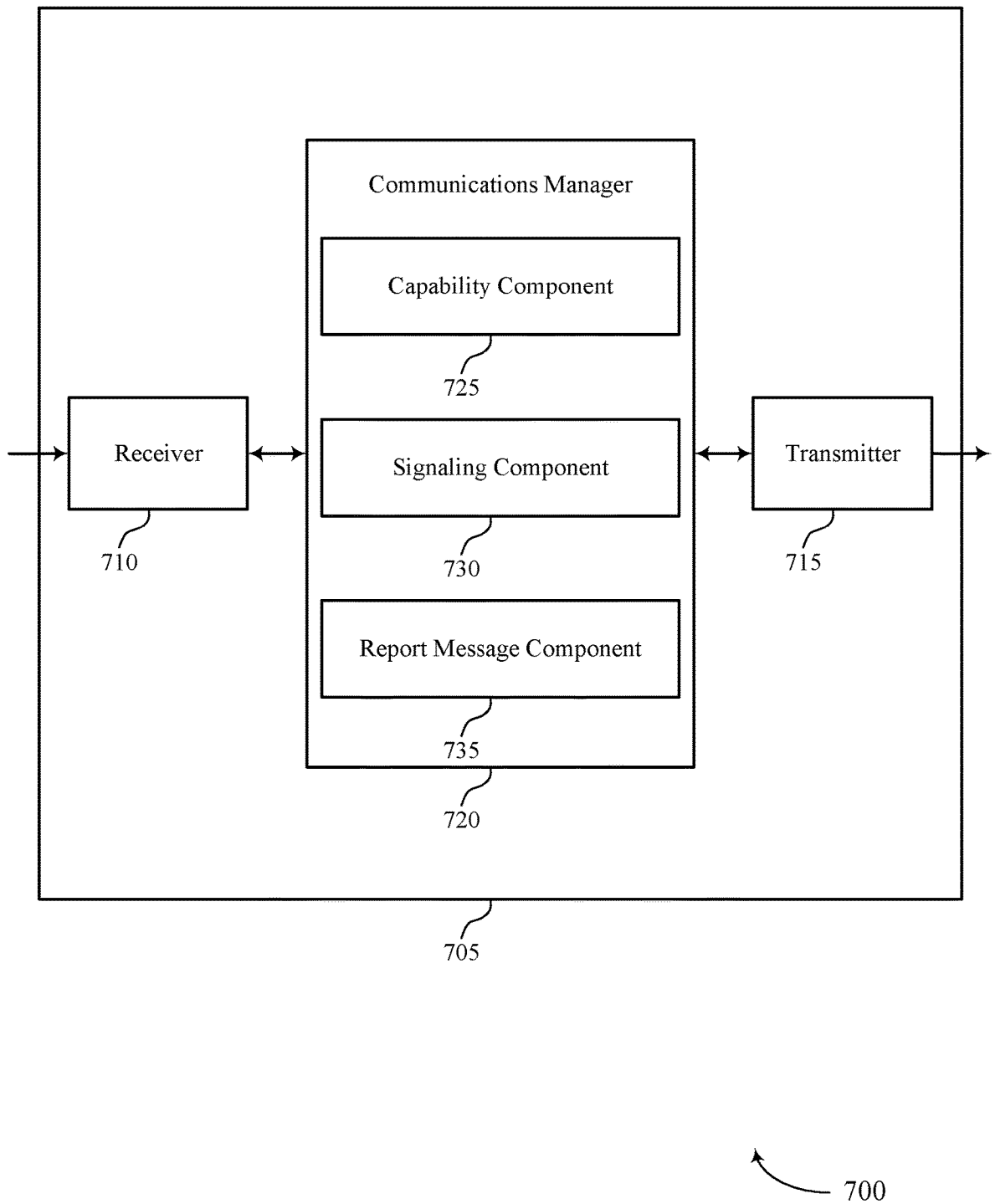

FIG. 7 shows a block diagram 700 of a device 705 that supports reciprocity reporting for wireless communications systems in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reciprocity report for wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reciprocity report for wireless communications systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reciprocity report for wireless communications systems as described herein. For example, the communications manager 720 may include a capability component 725, a signaling component 730, a report message component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The capability component 725 may be configured as or otherwise support a means for transmitting, to a base station, a control message indicating a capability of the UE to identify a reciprocity parameter between downlink communications and uplink communications of a channel between the UE and the base station. The signaling component 730 may be configured as or otherwise support a means for communicating signals over the channel using an array of antennas of the UE based on transmitting the control message. The report message component 735 may be configured as or otherwise support a means for transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

Figure 8:
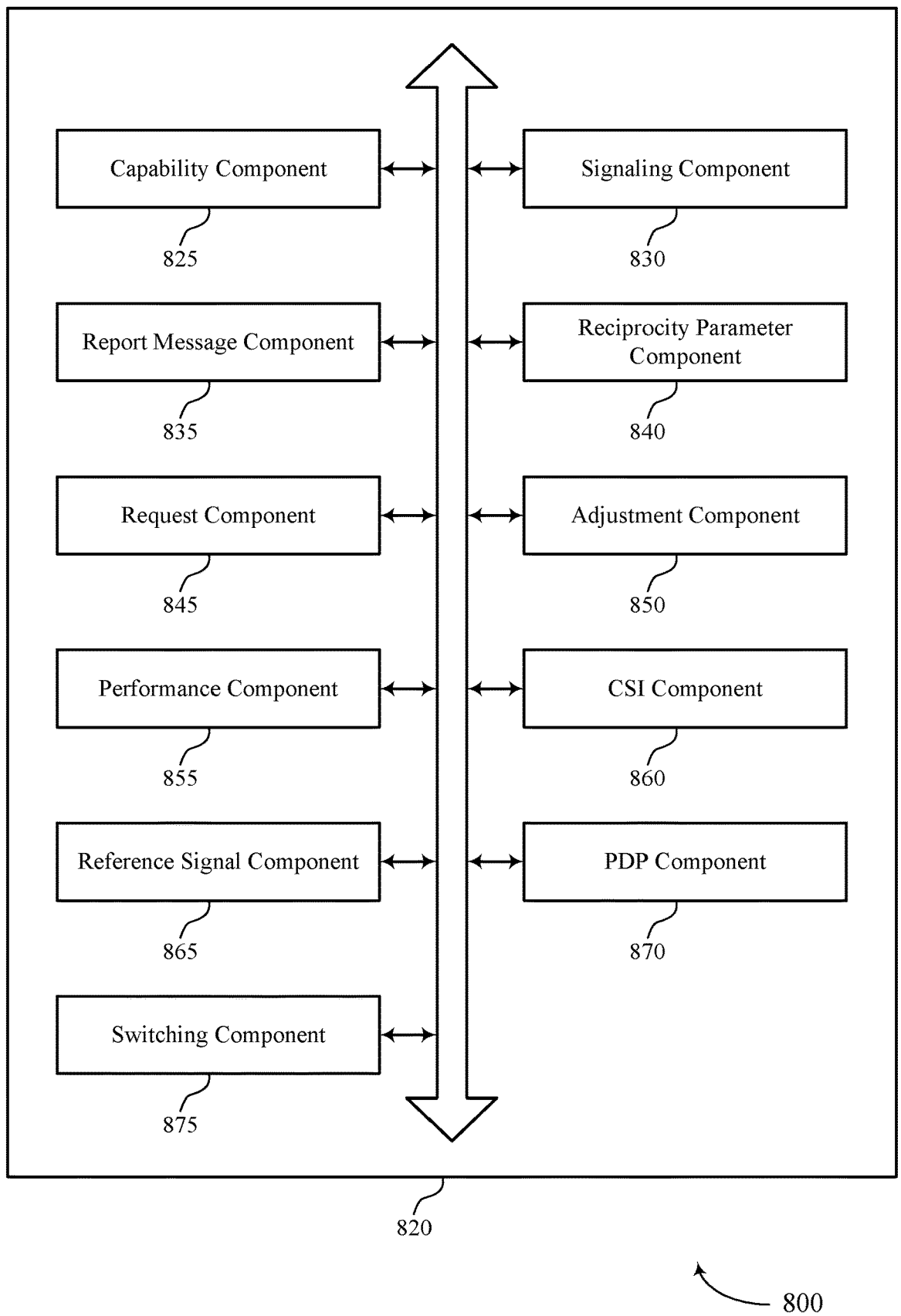
FIG. 8 shows a block diagram of a communications manager that supports reciprocity reporting for wireless communications systems in accordance with aspects of the present disclosure.

FIG. 8 shows a block diagram 800 of a communications manager 820 that supports reciprocity reporting for wireless communications systems in accordance with aspects of the present disclosure. The communications manager 820 may be an example of aspects of a communications manager 620, a communications manager 720, or both, as described herein. The communications manager 820, or various components thereof, may be an example of means for performing various aspects of reciprocity report for wireless communications systems as described herein. For example, the communications manager 820 may include a capability component 825, a signaling component 830, a report message component 835, a reciprocity parameter component 840, a request component 845, an adjustment component 850, a performance component 855, a CSI component 860, a reference signal component 865, a PDP component 870, a switching component 875, or any combination thereof. Each of these components may communicate, directly or indirectly, with one another (e.g., via one or more buses).

The communications manager 820 may support wireless communications at a UE in accordance with examples as disclosed herein. The capability component 825 may be configured as or otherwise support a means for transmitting, to a base station, a control message indicating a capability of the UE to identify a reciprocity parameter between downlink communications and uplink communications of a channel between the UE and the base station. The signaling component 830 may be configured as or otherwise support a means for communicating signals over the channel using an array of antennas of the UE based on transmitting the control message. The report message component 835 may be configured as or otherwise support a means for transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

In some examples, the reciprocity parameter component 840 may be configured as or otherwise support a means for identifying the reciprocity parameter based on the one or more parameters associated with the array of antennas of the UE, where transmitting the report message is based on identifying the reciprocity parameter.

In some examples, the one or more parameters associated with the array of antennas includes a quantity of antennas corresponding to a respective access link, a set of phase shifters corresponding to the respective access link, or a combination thereof. In some examples, identifying the reciprocity parameter is based on the quantity of antennas and the set of phase shifters.

In some examples, to support identifying the reciprocity parameter, the reciprocity parameter component 840 may be configured as or otherwise support a means for calculating the reciprocity parameter based on a first directivity of a receive beam associated with the downlink communications and a second directivity of a transmit beam associated with the uplink communications.

In some examples, to support identifying the reciprocity parameter, the PDP component 870 may be configured as or otherwise support a means for receiving a report indicating a first power delay profile of the uplink communications. In some examples, to support identifying the reciprocity parameter, the PDP component 870 may be configured as or otherwise support a means for correlating a second power delay profile of the downlink communications with the first power delay profile.

In some examples, the reciprocity parameter indicates a degree of overlap between an uplink beam and a downlink beam based on a frequency associated with the channel, the one or more parameters associated with the array of antennas, or both.

In some examples, the request component 845 may be configured as or otherwise support a means for receiving, from the base station, a request to adjust the one or more parameters associated with the array of antennas based on transmitting the report message. In some examples, the adjustment component 850 may be configured as or otherwise support a means for adjusting the one or more parameters in accordance with the received request.

In some examples, the request indicates a first transmission reception point, and the switching component 875 may be configured as or otherwise support a means for switching from a second transmission reception point to the first transmission reception point for the uplink communications and the downlink communications based on receiving the request.

In some examples, the request component 845 may be configured as or otherwise support a means for receiving a request message from the base station that requests the report message, where transmitting the report message is in response to receiving the request message.

In some examples, the performance component 855 may be configured as or otherwise support a means for transmitting a performance report message during a connection establishment with the base station, where transmitting the report message is based on transmitting the performance report message.

In some examples, the performance report message indicates a performance of the UE per rank in an additive white Gaussian noise model, one or more parameters associated with detection or decoding, or any combination thereof.

In some examples, the CSI component 860 may be configured as or otherwise support a means for receiving an indication to cancel or adjust a channel state information report based on transmitting the report message.

In some examples, to support communicating the signals over the channel, the reference signal component 865 may be configured as or otherwise support a means for transmitting a set of reference signals using the array of antennas, where transmitting the report message is based on transmitting the set of reference signals.

Figure 9:
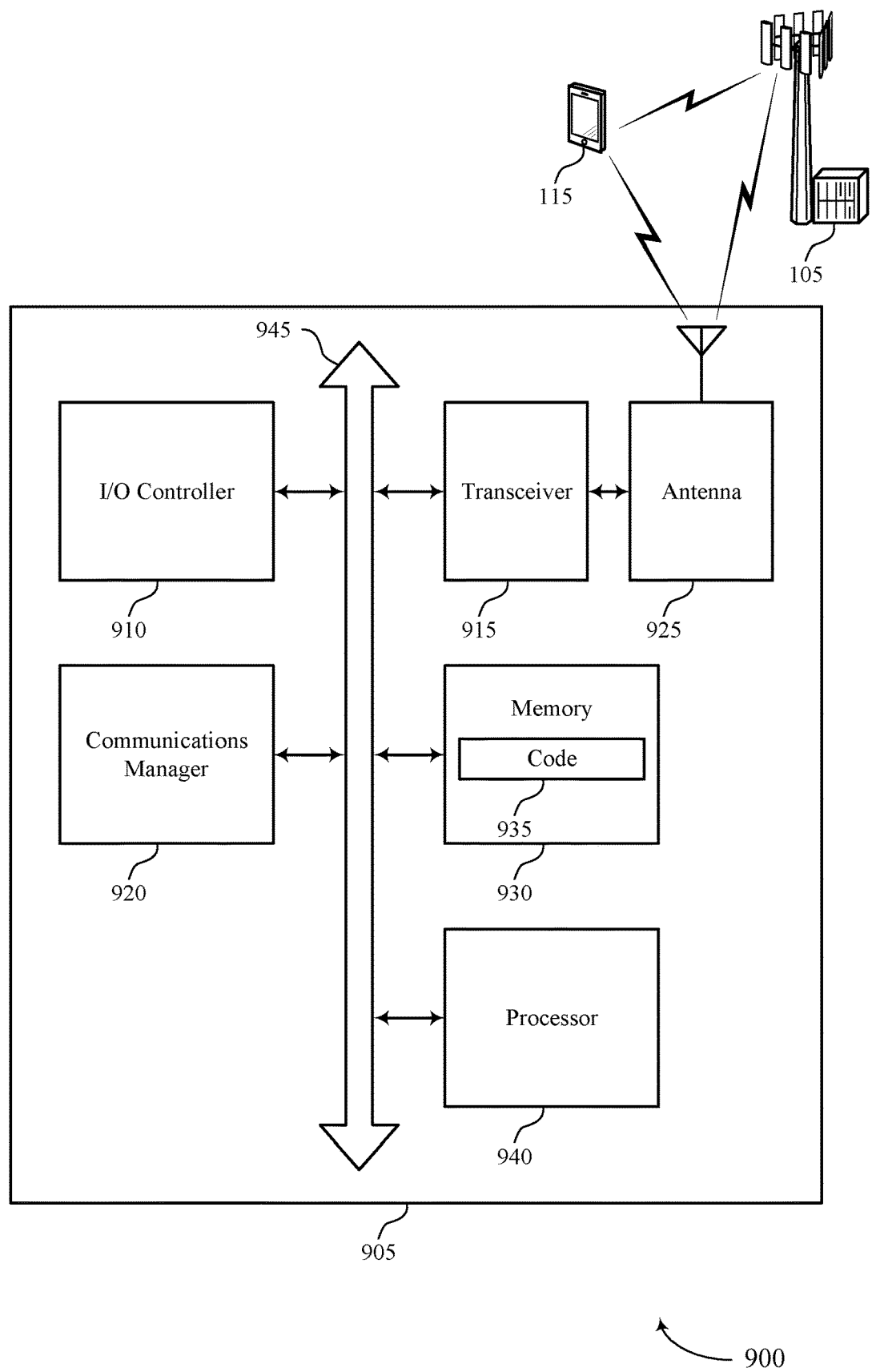
FIG. 9 shows a diagram of a system including a device that supports reciprocity reporting for wireless communications systems in accordance with aspects of the present disclosure.

FIG. 9 shows a diagram of a system 900 including a device 905 that supports reciprocity reporting for wireless communications systems in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reciprocity report for wireless communications systems). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting, to a base station, a control message indicating a capability of the UE to identify a reciprocity parameter between downlink communications and uplink communications of a channel between the UE and the base station. The communications manager 920 may be configured as or otherwise support a means for communicating signals over the channel using an array of antennas of the UE based on transmitting the control message. The communications manager 920 may be configured as or otherwise support a means for transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof.

By including or configuring the communications manager 920 in accordance with examples as described herein, the device 905 may support techniques for identifying a reciprocity parameter, reporting the reciprocity parameter, or both. By implementing such a reciprocity parameter, the device 905 may realize one or more potential advantages. For example, a base station may be enabled to reduce a frequency of reference signals or cancel a CSI-RS report at the device 905, which may result in reduced processing, reduced power consumption, more efficient utilization of communication resources (e.g., increased throughput), or any combination thereof at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reciprocity report for wireless communications systems as described herein, or the processor 940 and the memory 930 may be otherwise configured to perform or support such operations.

Figure 10:
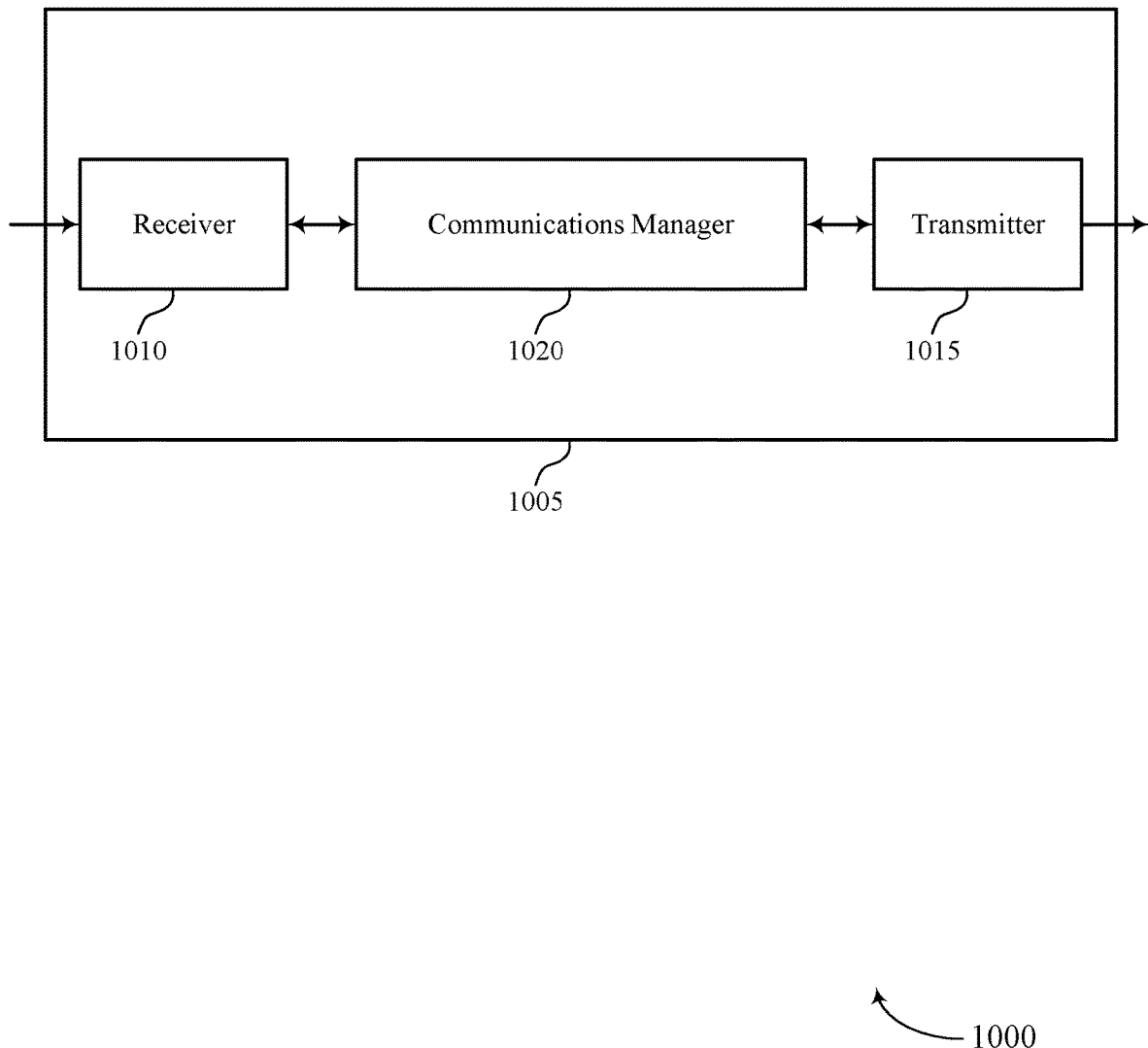
FIGS. 10 and 11 show block diagrams of devices that support reciprocity reporting for wireless communications systems in accordance with aspects of the present disclosure.

FIG. 10 shows a block diagram 1000 of a device 1005 that supports reciprocity reporting for wireless communications systems in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reciprocity report for wireless communications systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reciprocity report for wireless communications systems). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of reciprocity report for wireless communications systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving, from a UE, a control message indicating a capability of the UE to identify a reciprocity parameter between downlink communications and uplink communications of a channel between the UE and the base station. The communications manager 1020 may be configured as or otherwise support a means for communicating signals with the UE over the channel based on receiving the control message. The communications manager 1020 may be configured as or otherwise support a means for receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reporting of a reciprocity parameter. By implementing such a reciprocity parameter, the device 1005 may realize one or more potential advantages. For example, the device 1005 may be enabled to estimate a channel with less signaling overhead or latency, which may result in reduced processing, reduced power consumption, more efficient utilization of communication resources (e.g., increased throughput), or any combination thereof at the device 1005.

Figure 11:
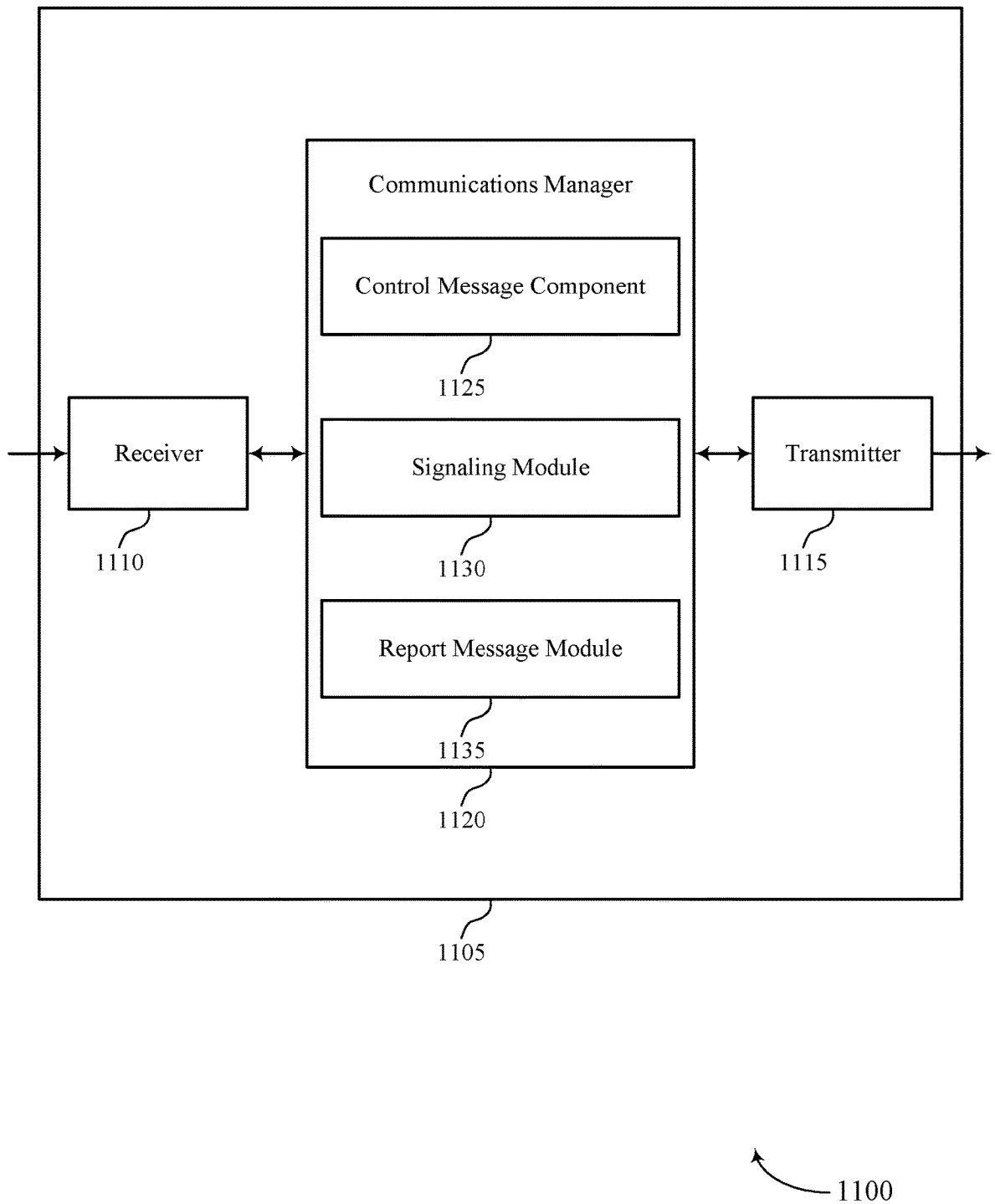

FIG. 11 shows a block diagram 1100 of a device 1105 that supports reciprocity reporting for wireless communications systems in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to reciprocity report for wireless communications systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to reciprocity report for wireless communications systems). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of reciprocity report for wireless communications systems as described herein. For example, the communications manager 1120 may include a control message component 1125, a signaling module 1130, a report message module 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The control message component 1125 may be configured as or otherwise support a means for receiving, from a UE, a control message indicating a capability of the UE to identify a reciprocity parameter between downlink communications and uplink communications of a channel between the UE and the base station. The signaling module 1130 may be configured as or otherwise support a means for communicating signals with the UE over the channel based on receiving the control message. The report message module 1135 may be configured as or otherwise support a means for receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

Figure 12:
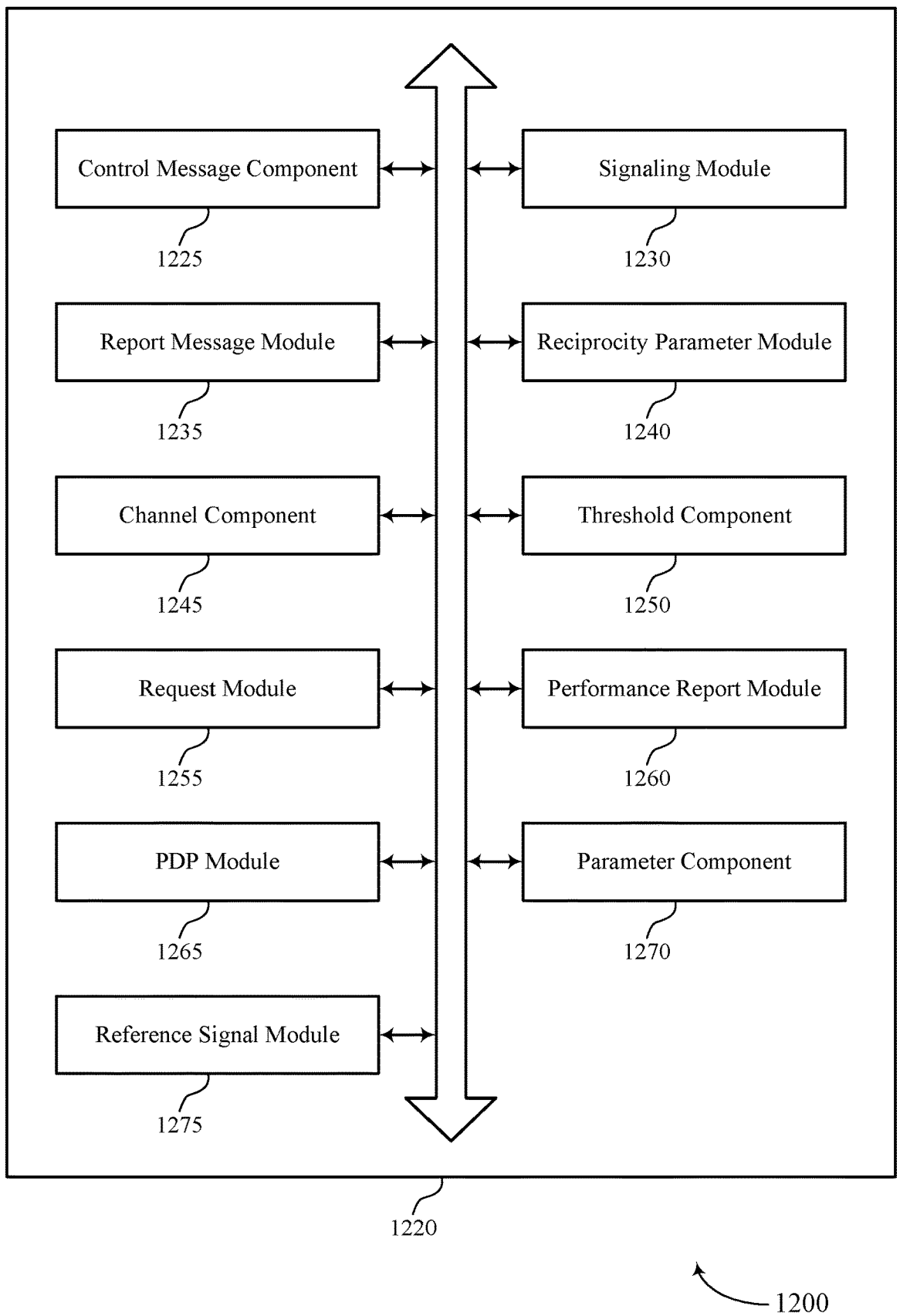
FIG. 12 shows a block diagram of a communications manager that supports reciprocity reporting for wireless communications systems in accordance with aspects of the present disclosure.

FIG. 12 shows a block diagram 1200 of a communications manager 1220 that supports reciprocity reporting for wireless communications systems in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of reciprocity report for wireless communications systems as described herein. For example, the communications manager 1220 may include a control message component 1225, a signaling module 1230, a report message module 1235, a reciprocity parameter module 1240, a channel component 1245, a threshold component 1250, a request module 1255, a performance report module 1260, a PDP module 1265, a parameter component 1270, a reference signal module 1275, or any combination thereof. Each of these components may communicate, directly or indirectly, with one another (e.g., via one or more buses).

The communications manager 1220 may support wireless communications at a base station in accordance with examples as disclosed herein. The control message component 1225 may be configured as or otherwise support a means for receiving, from a UE, a control message indicating a capability of the UE to identify a reciprocity parameter between downlink communications and uplink communications of a channel between the UE and the base station. The signaling module 1230 may be configured as or otherwise support a means for communicating signals with the UE over the channel based on receiving the control message. The report message module 1235 may be configured as or otherwise support a means for receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

In some examples, the reciprocity parameter module 1240 may be configured as or otherwise support a means for identifying the reciprocity parameter based on receiving the report message.

In some examples, the reciprocity parameter indicates a degree of overlap between an uplink beam and a downlink beam based on a frequency associated with the channel, the one or more parameters associated with a set of antennas at the UE, or both.

In some examples, the channel component 1245 may be configured as or otherwise support a means for identifying a first channel measurement associated with the uplink communications based on communicating the signals with the UE. In some examples, the channel component 1245 may be configured as or otherwise support a means for identifying a second channel measurement associated with the downlink communications using the first channel measurement and the reciprocity parameter.

In some examples, the parameter component 1270 may be configured as or otherwise support a means for identifying one or more parameters associated with the downlink communications based on the second channel measurement and a reported signal to noise ratio, the one or more parameters including a pre-coding matrix indicator, a rank indicator, a modulation and coding scheme, or any combination thereof.

In some examples, to support communicating the signals over the channel, the reference signal module 1275 may be configured as or otherwise support a means for receiving a set of reference signals, where identifying the first channel measurement is based on receiving the set of reference signals.

In some examples, the threshold component 1250 may be configured as or otherwise support a means for determining whether the reciprocity parameter satisfies a threshold. In some examples, the request module 1255 may be configured as or otherwise support a means for transmitting a request to adjust the one or more parameters associated with the array of antennas of the UE based on the reciprocity parameter failing to satisfy the threshold.

In some examples, the request module 1255 may be configured as or otherwise support a means for transmitting a request message to the UE that requests the report message, where receiving the report message is in response to transmitting the request message.

In some examples, the performance report module 1260 may be configured as or otherwise support a means for receiving a performance report message during a connection establishment with the UE, where receiving the report message is based on receiving the performance report message.

In some examples, the performance report message indicates a performance of the UE per rank in an additive white Gaussian noise model, one or more parameters associated with detection or decoding, or any combination thereof.

In some examples, the PDP module 1265 may be configured as or otherwise support a means for identifying a first power delay profile of the uplink communications. In some examples, the PDP module 1265 may be configured as or otherwise support a means for transmitting, to the UE, a report indicating the first power delay profile of the uplink communications, where receiving the report message is based on transmitting the report indicating the first power delay profile.

Figure 13:
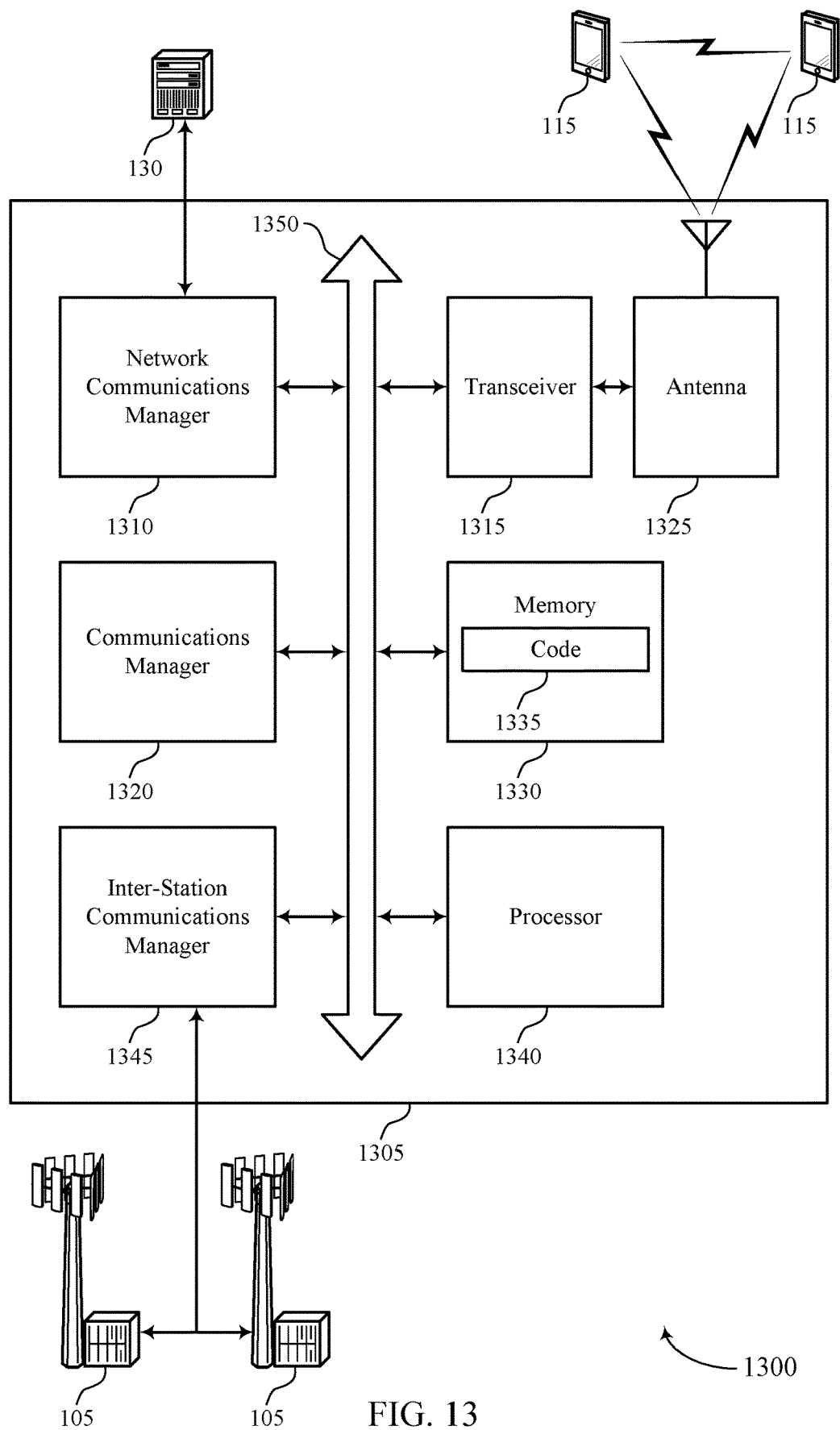
FIG. 13 shows a diagram of a system including a device that supports reciprocity reporting for wireless communications systems in accordance with aspects of the present disclosure.

FIG. 13 shows a diagram of a system 1300 including a device 1305 that supports reciprocity reporting for wireless communications systems in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting reciprocity report for wireless communications systems). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving, from a UE, a control message indicating a capability of the UE to identify a reciprocity parameter between downlink communications and uplink communications of a channel between the UE and the base station. The communications manager 1320 may be configured as or otherwise support a means for communicating signals with the UE over the channel based on receiving the control message. The communications manager 1320 may be configured as or otherwise support a means for receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof.

By including or configuring the communications manager 1320 in accordance with examples as described herein, the device 1305 may support techniques for reporting of a reciprocity parameter. By implementing such a reciprocity parameter, the device 1305 may realize one or more potential advantages. For example, the device 1305 may be enabled to estimate a channel with less signaling overhead or latency, which may result in reduced processing, reduced power consumption, more efficient utilization of communication resources (e.g., increased throughput), or any combination thereof at the device 1305.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of reciprocity report for wireless communications systems as described herein, or the processor 1340 and the memory 1330 may be otherwise configured to perform or support such operations.

Figure 14:
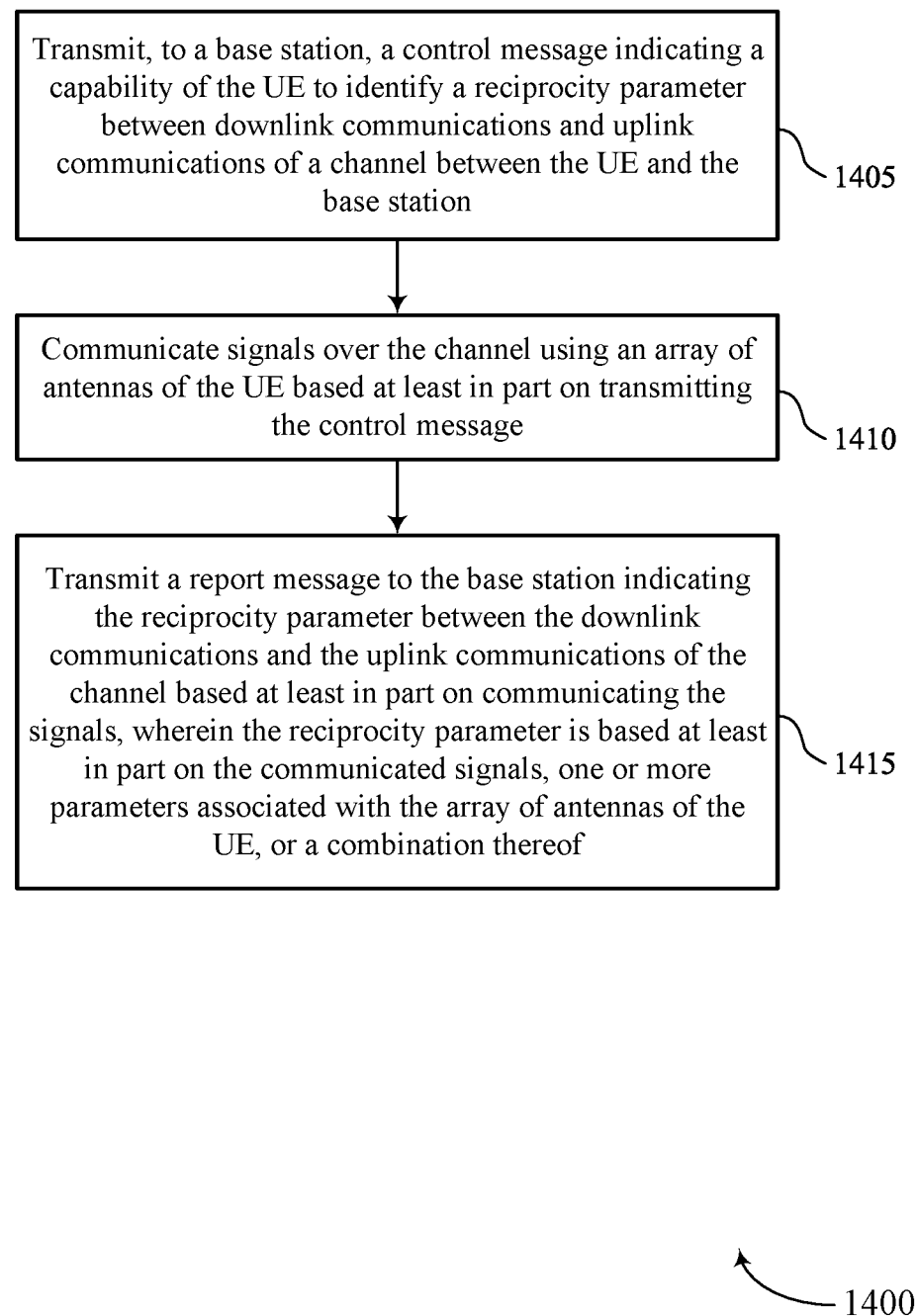
FIGS. 14 through 17 show flowcharts illustrating methods that support reciprocity reporting for wireless communications systems in accordance with aspects of the present disclosure.

FIG. 14 shows a flowchart illustrating a method 1400 that supports reciprocity reporting for wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a control message indicating a capability of the UE to identify a reciprocity parameter between downlink communications and uplink communications of a channel between the UE and the base station. The operations of 1405 may be performed in accordance with examples as disclosed herein. In some examples, aspects of the operations of 1405 may be performed by a capability component 825 as described with reference to FIG. 8.

At 1410, the method may include communicating signals over the channel using an array of antennas of the UE based on transmitting the control message. The operations of 1410 may be performed in accordance with examples as disclosed herein. In some examples, aspects of the operations of 1410 may be performed by a signaling component 830 as described with reference to FIG. 8.

At 1415, the method may include transmitting a report message to the base station indicating the reciprocity parameter between the downlink communications and the uplink communications of the channel based on communicating the signals, where the reciprocity parameter is based on the communicated signals, one or more parameters associated with the array of antennas of the UE, or a combination thereof. The operations of 1415 may be performed in accordance with examples as disclosed herein. In some examples, aspects of the operations of 1415 may be performed by a report message component 835 as described with reference to FIG. 8.

Figure 15:
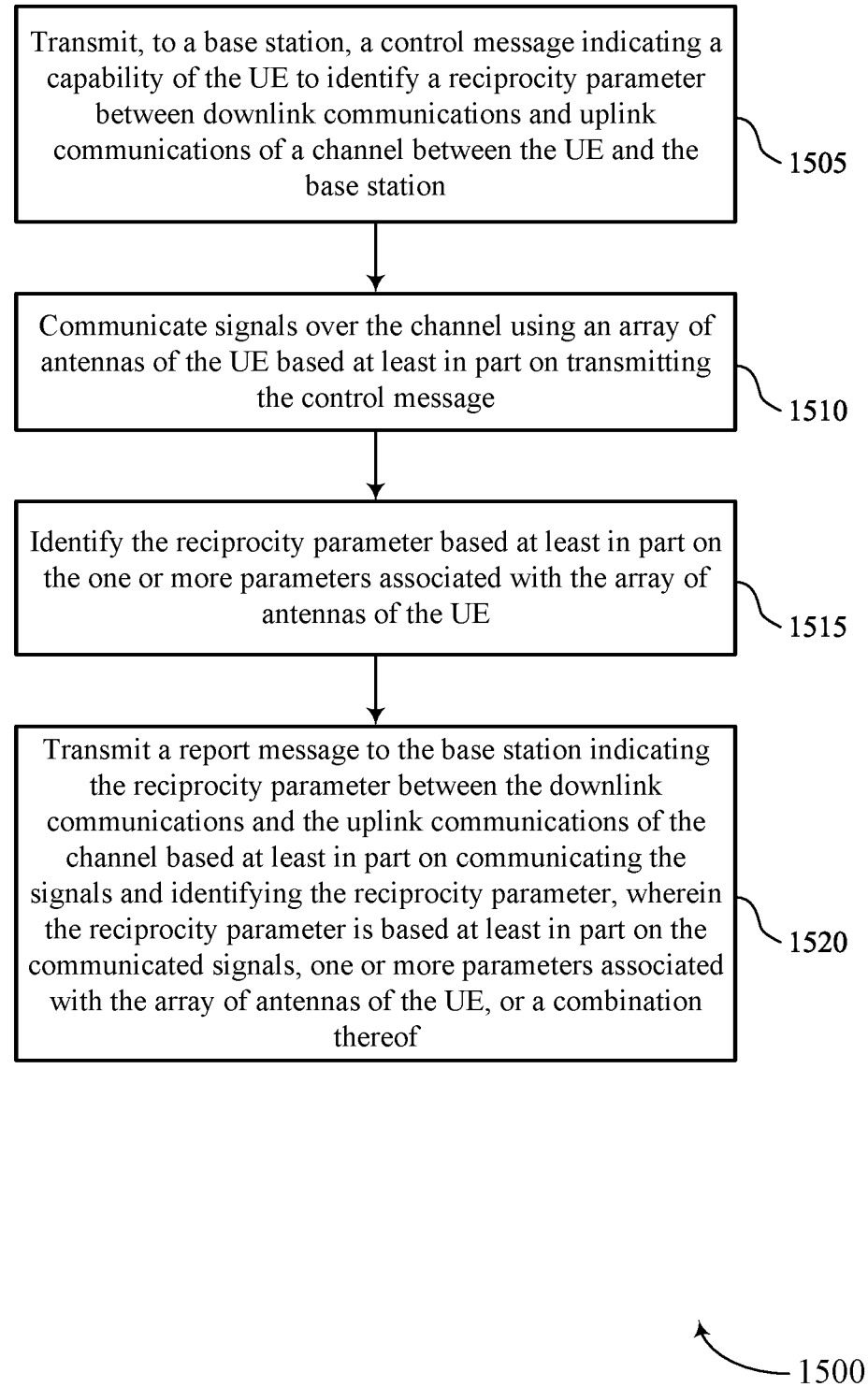

FIG. 15 shows a flowchart illustrating a method 1500 that supports reciprocity reporting for wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a control message indicating a capability of the UE to identify a reciprocity parameter between downlink communications and uplink communications of a channel between the UE and the base station. The operations of 1505 may be performed in accordance with examples as disclosed herein. In some examples, aspects of the operations of 1505 may be performed by a capability component 825 as described with reference to FIG. 8.

At 1510, the method may include communicating signals over the channel using an array of antennas of the UE based on transmitting the control message. The operations of 1510 may be performed in accordance with examples as disclosed herein. In some examples, aspects of the operations of 1510 may be performed by a signaling component 830 as described with reference to FIG. 8.

At 1515, the method may include identifying the reciprocity parameter based on the one or more parameters associated with the array of antennas of the UE. The operations of 1515 may be performed in accordance with examples as disclosed herein. In some examples, aspects of the operations of 1515 may be performed by a reciprocity parameter component 840 as described with reference to FIG. 8.

At 1520, the method may include transmitting a report message to the base station indicating the reciprocity parameter between the downlink communications and the uplink communications of the channel based on communicating the signals and identifying the reciprocity parameter, where the reciprocity parameter is based on the communicated signals, one or more parameters associated with the array of antennas of the UE, or a combination thereof. The operations of 1520 may be performed in accordance with examples as disclosed herein. In some examples, aspects of the operations of 1520 may be performed by a report message component 835 as described with reference to FIG. 8.

Figure 16:
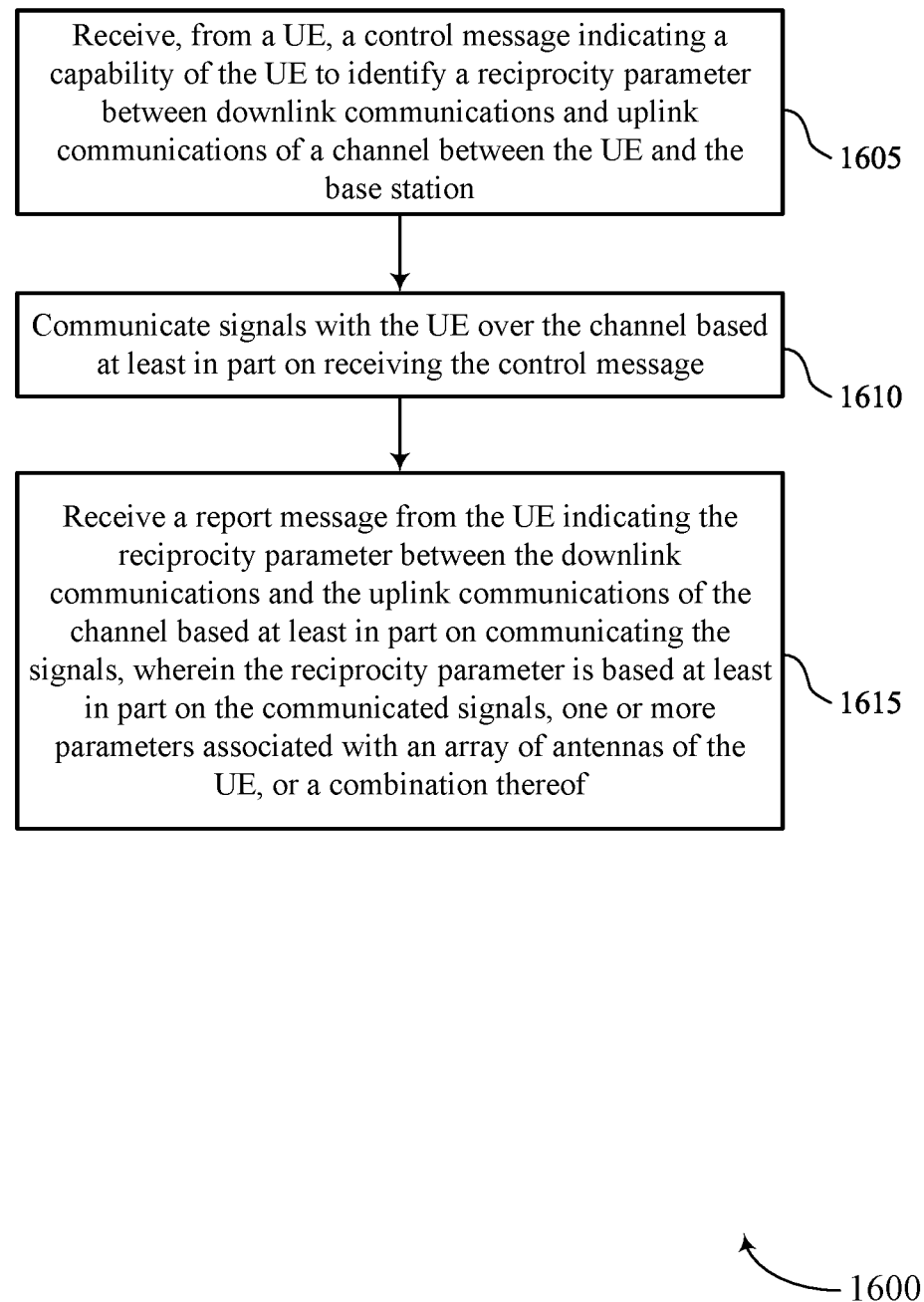

FIG. 16 shows a flowchart illustrating a method 1600 that supports reciprocity reporting for wireless communications systems in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a control message indicating a capability of the UE to identify a reciprocity parameter between downlink communications and uplink communications of a channel between the UE and the base station. The operations of 1605 may be performed in accordance with examples as disclosed herein. In some examples, aspects of the operations of 1605 may be performed by a control message component 1225 as described with reference to FIG. 12.

At 1610, the method may include communicating signals with the UE over the channel based on receiving the control message. The operations of 1610 may be performed in accordance with examples as disclosed herein. In some examples, aspects of the operations of 1610 may be performed by a signaling module 1230 as described with reference to FIG. 12.

At 1615, the method may include receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof. The operations of 1615 may be performed in accordance with examples as disclosed herein. In some examples, aspects of the operations of 1615 may be performed by a report message module 1235 as described with reference to FIG. 12.

Figure 17:
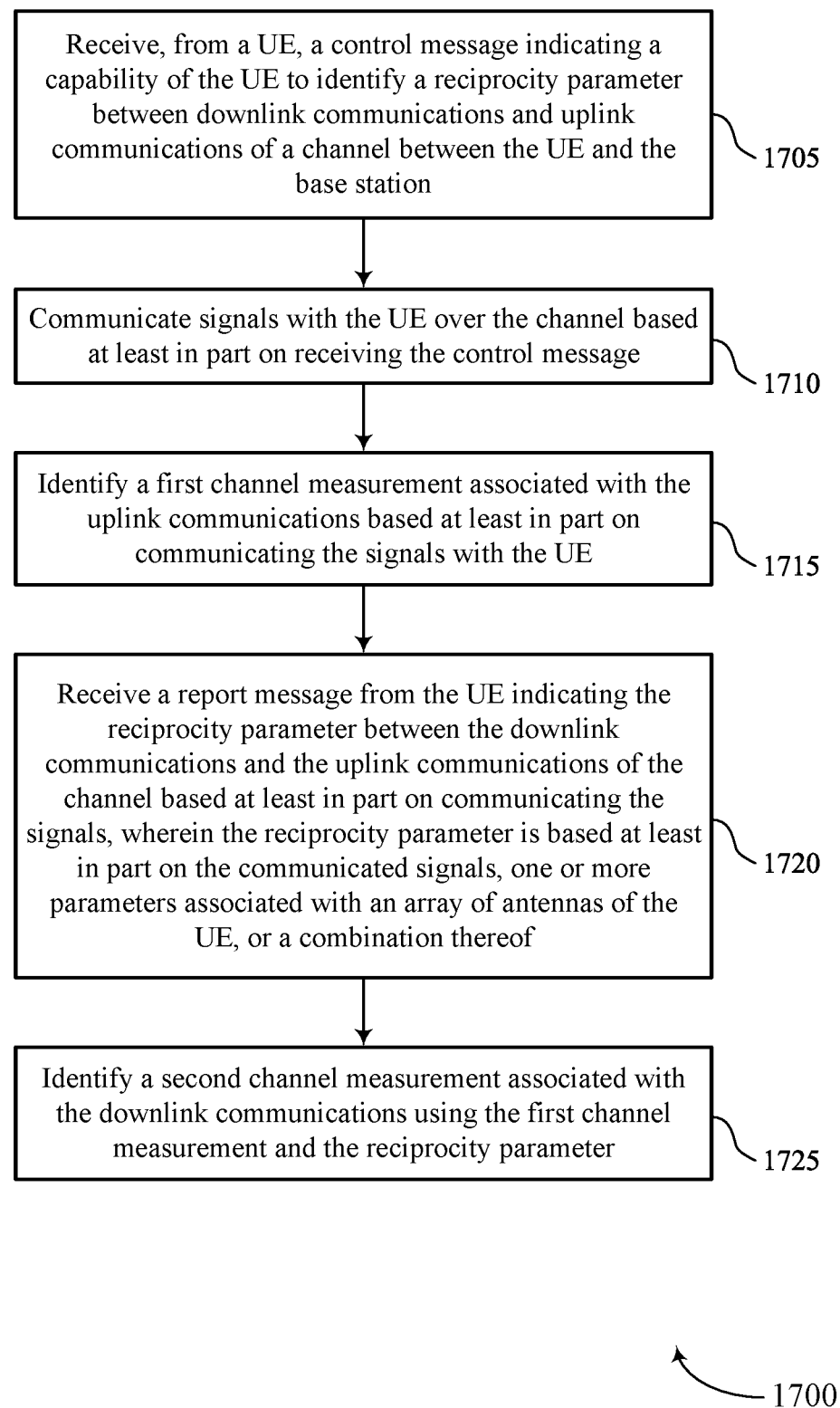

FIG. 17 shows a flowchart illustrating a method 1700 that supports reciprocity reporting for wireless communications systems in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a control message indicating a capability of the UE to identify a reciprocity parameter between downlink communications and uplink communications of a channel between the UE and the base station. The operations of 1705 may be performed in accordance with examples as disclosed herein. In some examples, aspects of the operations of 1705 may be performed by a control message component 1225 as described with reference to FIG. 12.

At 1710, the method may include communicating signals with the UE over the channel based on receiving the control message. The operations of 1710 may be performed in accordance with examples as disclosed herein. In some examples, aspects of the operations of 1710 may be performed by a signaling module 1230 as described with reference to FIG. 12.

At 1715, the method may include identifying a first channel measurement associated with the uplink communications based on communicating the signals with the UE. The operations of 1715 may be performed in accordance with examples as disclosed herein. In some examples, aspects of the operations of 1715 may be performed by a channel component 1245 as described with reference to FIG. 12.

At 1720, the method may include receiving a report message from the UE indicating the reciprocity parameter between the downlink communications and the uplink communications of the channel based on communicating the signals, where the reciprocity parameter is based on the communicated signals, one or more parameters associated with an array of antennas of the UE, or a combination thereof. The operations of 1720 may be performed in accordance with examples as disclosed herein. In some examples, aspects of the operations of 1720 may be performed by a report message module 1235 as described with reference to FIG. 12.

At 1725, the method may include identifying a second channel measurement associated with the downlink communications using the first channel measurement and the reciprocity parameter. The operations of 1725 may be performed in accordance with examples as disclosed herein. In some examples, aspects of the operations of 1725 may be performed by a channel component 1245 as described with reference to FIG. 12.

The following provides an overview of aspects of the present disclosure:

Aspect 1: A method for wireless communications at a UE, comprising: transmitting, to a base station, a control message indicating a capability of the UE to identify a reciprocity parameter between downlink communications and uplink communications of a channel between the UE and the base station; communicating signals over the channel using an array of antennas of the UE based at least in part on transmitting the control message; and transmitting a report message to the base station indicating the reciprocity parameter between the downlink communications and the uplink communications of the channel based at least in part on communicating the signals, wherein the reciprocity parameter is based at least in part on the communicated signals, one or more parameters associated with the array of antennas of the UE, or a combination thereof.

Aspect 2: The method of aspect 1, further comprising: identifying the reciprocity parameter based at least in part on the one or more parameters associated with the array of antennas of the UE, wherein transmitting the report message is based at least in part on identifying the reciprocity parameter.

Aspect 3: The method of aspect 2, wherein the one or more parameters associated with the array of antennas comprises a quantity of antennas corresponding to a respective access link, a set of phase shifters corresponding to the respective access link, or a combination thereof, and identifying the reciprocity parameter is based at least in part on the quantity of antennas and the set of phase shifters.

Aspect 4: The method of any of aspects 2 through 3, wherein identifying the reciprocity parameter comprises: calculating the reciprocity parameter based at least in part on a first directivity of a receive beam associated with the downlink communications and a second directivity of a transmit beam associated with the uplink communications.

Aspect 5: The method of any of aspects 2 through 3, wherein identifying the reciprocity parameter comprises: receiving a report indicating a first power delay profile of the uplink communications; and correlating a second power delay profile of the downlink communications with the first power delay profile.

Aspect 6: The method of any of aspects 1 through 5, wherein the reciprocity parameter indicates a degree of overlap between an uplink beam and a downlink beam based at least in part on a frequency associated with the channel, the one or more parameters associated with the array of antennas, or both.

Aspect 7: The method of any of aspects 1 through 6, further comprising: receiving, from the base station, a request to adjust the one or more parameters associated with the array of antennas based at least in part on transmitting the report message; and adjusting the one or more parameters in accordance with the received request.

Aspect 8: The method of aspect 7, wherein the request indicates a first transmission reception point, the method further comprising: switching from a second transmission reception point to the first transmission reception point for the uplink communications and the downlink communications based at least in part on receiving the request.

Aspect 9: The method of any of aspects 1 through 8, further comprising: receiving a request message from the base station that requests the report message, wherein transmitting the report message is in response to receiving the request message.

Aspect 10: The method of any of aspects 1 through 9, further comprising: transmitting a performance report message during a connection establishment with the base station, wherein transmitting the report message is based at least in part on transmitting the performance report message.

Aspect 11: The method of aspect 10, wherein the performance report message indicates a performance of the UE per rank in an additive white Gaussian noise model, one or more parameters associated with detection or decoding, or any combination thereof.

Aspect 12: The method of any of aspects 1 through 11, further comprising: receiving an indication to cancel or adjust a channel state information report based at least in part on transmitting the report message.

Aspect 13: The method of any of aspects 1 through 12, wherein communicating the signals over the channel comprises: transmitting a set of reference signals using the array of antennas, wherein transmitting the report message is based at least in part on transmitting the set of reference signals.

Aspect 14: A method for wireless communications at a base station, comprising: receiving, from a UE, a control message indicating a capability of the UE to identify a reciprocity parameter between downlink communications and uplink communications of a channel between the UE and the base station; communicating signals with the UE over the channel based at least in part on receiving the control message; and receiving a report message from the UE indicating the reciprocity parameter between the downlink communications and the uplink communications of the channel based at least in part on communicating the signals, wherein the reciprocity parameter is based at least in part on the communicated signals, one or more parameters associated with an array of antennas of the UE, or a combination thereof.

Aspect 15: The method of aspect 14, further comprising: identifying the reciprocity parameter based at least in part on receiving the report message.

Aspect 16: The method of any of aspects 14 through 15, wherein the reciprocity parameter indicates a degree of overlap between an uplink beam and a downlink beam based at least in part on a frequency associated with the channel, the one or more parameters associated with a set of antennas at the UE, or both.

Aspect 17: The method of any of aspects 14 through 16, further comprising: identifying a first channel measurement associated with the uplink communications based at least in part on communicating the signals with the UE; and identifying a second channel measurement associated with the downlink communications using the first channel measurement and the reciprocity parameter.

Aspect 18: The method of aspect 17, further comprising: identifying one or more parameters associated with the downlink communications based at least in part on the second channel measurement and a reported signal to noise ratio, the one or more parameters comprising a pre-coding matrix indicator, a rank indicator, a modulation and coding scheme, or any combination thereof.

Aspect 19: The method of any of aspects 17 through 18, wherein communicating the signals over the channel comprises: receiving a set of reference signals, wherein identifying the first channel measurement is based at least in part on receiving the set of reference signals.

Aspect 20: The method of any of aspects 14 through 19, further comprising: determining whether the reciprocity parameter satisfies a threshold; and transmitting a request to adjust the one or more parameters associated with the array of antennas of the UE based at least in part on the reciprocity parameter failing to satisfy the threshold.

Aspect 21: The method of any of aspects 14 through 20, further comprising: transmitting a request message to the UE that requests the report message, wherein receiving the report message is in response to transmitting the request message.

Aspect 22: The method of any of aspects 14 through 21, further comprising: receiving a performance report message during a connection establishment with the UE, wherein receiving the report message is based at least in part on receiving the performance report message.

Aspect 23: The method of aspect 22, wherein the performance report message indicates a performance of the UE per rank in an additive white Gaussian noise model, one or more parameters associated with detection or decoding, or any combination thereof.

Aspect 24: The method of any of aspects 14 through 23, further comprising: identifying a first power delay profile of the uplink communications; and transmitting, to the UE, a report indicating the first power delay profile of the uplink communications, wherein receiving the report message is based at least in part on transmitting the report indicating the first power delay profile.

Aspect 25: An apparatus for wireless communications at a UE, comprising a processor; memory coupled with the processor; and instructions stored in the memory and executable by the processor to cause the apparatus to perform a method of any of aspects 1 through 13.

Aspect 26: An apparatus for wireless communications at a UE, comprising at least one means for performing a method of any of aspects 1 through 13.

Aspect 27: A non-transitory computer-readable medium storing code for wireless communications at a UE, the code comprising instructions executable by a processor to perform a method of any of aspects 1 through 13.

Aspect 28: An apparatus for wireless communications at a base station, comprising a processor; memory coupled with the processor; and instructions stored in the memory and executable by the processor to cause the apparatus to perform a method of any of aspects 14 through 24.

Aspect 29: An apparatus for wireless communications at a base station, comprising at least one means for performing a method of any of aspects 14 through 24.

Aspect 30: A non-transitory computer-readable medium storing code for wireless communications at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a base station, a control message indicating a capability of the UE to identify a reciprocity parameter between downlink communications and uplink communications of a channel between the UE and the base station;
   communicating signals over the channel using an array of antennas of the UE based at least in part on transmitting the control message; and
   transmitting a report message to the base station indicating the reciprocity parameter between the downlink communications and the uplink communications of the channel based at least in part on communicating the signals, wherein the reciprocity parameter is based at least in part on the communicated signals, one or more parameters associated with the array of antennas of the UE, or a combination thereof.

2. The method of claim 1, further comprising:
   identifying the reciprocity parameter based at least in part on the one or more parameters associated with the array of antennas of the UE, wherein transmitting the report message is based at least in part on identifying the reciprocity parameter.

3. The method of claim 2, wherein:
   the one or more parameters associated with the array of antennas comprises a quantity of antennas corresponding to a respective access link, a set of phase shifters corresponding to the respective access link, or a combination thereof, and
   identifying the reciprocity parameter is based at least in part on the quantity of antennas and the set of phase shifters.

4. The method of claim 2, wherein identifying the reciprocity parameter comprises:
   calculating the reciprocity parameter based at least in part on a first directivity of a receive beam associated with the downlink communications and a second directivity of a transmit beam associated with the uplink communications.

5. The method of claim 2, wherein identifying the reciprocity parameter comprises:
   receiving a report indicating a first power delay profile of the uplink communications; and
   correlating a second power delay profile of the downlink communications with the first power delay profile.

6. The method of claim 1, wherein the reciprocity parameter indicates a degree of overlap between an uplink beam and a downlink beam based at least in part on a frequency associated with the channel, the one or more parameters associated with the array of antennas, or both.

7. The method of claim 1, further comprising:
   receiving, from the base station, a request to adjust the one or more parameters associated with the array of antennas based at least in part on transmitting the report message; and
   adjusting the one or more parameters in accordance with the received request.

8. The method of claim 7, wherein the request indicates a first transmission reception point, the method further comprising:
switching from a second transmission reception point to the first transmission reception point for the uplink communications and the downlink communications based at least in part on receiving the request.

9. The method of claim 1, further comprising:
receiving a request message from the base station that requests the report message, wherein transmitting the report message is in response to receiving the request message.

10. The method of claim 1, further comprising:
transmitting a performance report message during a connection establishment with the base station, wherein transmitting the report message is based at least in part on transmitting the performance report message.

11. The method of claim 10, wherein the performance report message indicates a performance of the UE per rank in an additive white Gaussian noise model, one or more parameters associated with detection or decoding, or any combination thereof.

12. The method of claim 1, further comprising:
receiving an indication to cancel or adjust a channel state information report based at least in part on transmitting the report message.

13. The method of claim 1, wherein communicating the signals over the channel comprises:
transmitting a set of reference signals using the array of antennas, wherein transmitting the report message is based at least in part on transmitting the set of reference signals.

14. A method for wireless communications at a base station, comprising:
receiving, from a user equipment (UE), a control message indicating a capability of the UE to identify a reciprocity parameter between downlink communications and uplink communications of a channel between the UE and the base station;
communicating signals with the UE over the channel based at least in part on receiving the control message; and
receiving a report message from the UE indicating the reciprocity parameter between the downlink communications and the uplink communications of the channel based at least in part on communicating the signals, wherein the reciprocity parameter is based at least in part on the communicated signals, one or more parameters associated with an array of antennas of the UE, or a combination thereof.

15. The method of claim 14, further comprising:
identifying the reciprocity parameter based at least in part on receiving the report message.

16. The method of claim 14, wherein the reciprocity parameter indicates a degree of overlap between an uplink beam and a downlink beam based at least in part on a frequency associated with the channel, the one or more parameters associated with a set of antennas at the UE, or both.

17. The method of claim 14, further comprising:
identifying a first channel measurement associated with the uplink communications based at least in part on communicating the signals with the UE; and
identifying a second channel measurement associated with the downlink communications using the first channel measurement and the reciprocity parameter.

18. The method of claim 17, further comprising:
identifying one or more parameters associated with the downlink communications based at least in part on the second channel measurement and a reported signal to noise ratio, the one or more parameters comprising a pre-coding matrix indicator, a rank indicator, a modulation and coding scheme, or any combination thereof.

19. The method of claim 17, wherein communicating the signals over the channel comprises:
receiving a set of reference signals, wherein identifying the first channel measurement is based at least in part on receiving the set of reference signals.

20. The method of claim 14, further comprising:
determining whether the reciprocity parameter satisfies a threshold; and
transmitting a request to adjust the one or more parameters associated with the array of antennas of the UE based at least in part on the reciprocity parameter failing to satisfy the threshold.

21. The method of claim 14, further comprising:
transmitting a request message to the UE that requests the report message, wherein receiving the report message is in response to transmitting the request message.

22. The method of claim 14, further comprising:
receiving a performance report message during a connection establishment with the UE, wherein receiving the report message is based at least in part on receiving the performance report message.

23. The method of claim 22, wherein the performance report message indicates a performance of the UE per rank in an additive white Gaussian noise model, one or more parameters associated with detection or decoding, or any combination thereof.

24. The method of claim 14, further comprising:
identifying a first power delay profile of the uplink communications; and
transmitting, to the UE, a report indicating the first power delay profile of the uplink communications, wherein receiving the report message is based at least in part on transmitting the report indicating the first power delay profile.

25. An apparatus for wireless communications at a user equipment (UE), comprising:
a processor;
memory coupled with the processor; and
instructions stored in the memory and executable by the processor to cause the apparatus to:
transmit, to a base station, a control message indicating a capability of the UE to identify a reciprocity parameter between downlink communications and uplink communications of a channel between the UE and the base station;
communicate signals over the channel using an array of antennas of the UE based at least in part on transmitting the control message; and
transmit a report message to the base station indicating the reciprocity parameter between the downlink communications and the uplink communications of the channel based at least in part on communicating the signals, wherein the reciprocity parameter is based at least in part on the communicated signals, one or more parameters associated with the array of antennas of the UE, or a combination thereof.

26. The apparatus of claim 25, wherein the instructions are further executable by the processor to cause the apparatus to:
identify the reciprocity parameter based at least in part on the one or more parameters associated with the array of antennas of the UE, wherein transmitting the report message is based at least in part on identifying the reciprocity parameter.

27. The apparatus of claim 26, wherein:
the one or more parameters associated with the array of antennas comprises a quantity of antennas corresponding to a respective access link, a set of phase shifters corresponding to the respective access link, or a combination thereof, and
identifying the reciprocity parameter is based at least in part on the quantity of antennas and the set of phase shifters.

28. An apparatus for wireless communications at a base station, comprising:
a processor;
memory coupled with the processor; and
instructions stored in the memory and executable by the processor to cause the apparatus to:
receive, from a user equipment (UE), a control message indicating a capability of the UE to identify a reciprocity parameter between downlink communications and uplink communications of a channel between the UE and the base station;
communicate signals with the UE over the channel based at least in part on receiving the control message; and
receive a report message from the UE indicating the reciprocity parameter between the downlink communications and the uplink communications of the channel based at least in part on communicating the signals, wherein the reciprocity parameter is based at least in part on the communicated signals, one or more parameters associated with an array of antennas of the UE, or a combination thereof.

29. The apparatus of claim 28, wherein the instructions are further executable by the processor to cause the apparatus to:
identify the reciprocity parameter based at least in part on receiving the report message.

30. The apparatus of claim 28, wherein the reciprocity parameter indicates a degree of overlap between an uplink beam and a downlink beam based at least in part on a frequency associated with the channel, the one or more parameters associated with a set of antennas at the UE, or both.

* * * * *